(12) United States Patent
Ohno et al.

(10) Patent No.: US 12,101,013 B2
(45) Date of Patent: Sep. 24, 2024

(54) MOTOR, MOTOR STATE DETECTION DEVICE, AND MOTOR STATE DETERMINATION DEVICE

(71) Applicant: MINEBEA MITSUMI Inc., Nagano (JP)

(72) Inventors: Yuma Ohno, Hamamatsu (JP); Toshihiro Tamitsuji, Iwata (JP); Yuya Hisatomi, Hamamatsu (JP)

(73) Assignee: MINEBEA MITSUMI Inc., Nagano (JP)

( * ) Notice: Subject to any disclaimer, the term of this patent is extended or adjusted under 35 U.S.C. 154(b) by 381 days.

(21) Appl. No.: 17/437,165

(22) PCT Filed: Mar. 10, 2020

(86) PCT No.: PCT/JP2020/010194
§ 371 (c)(1),
(2) Date: Sep. 8, 2021

(87) PCT Pub. No.: WO2020/189398
PCT Pub. Date: Sep. 24, 2020

(65) Prior Publication Data
US 2022/0170507 A1     Jun. 2, 2022

(30) Foreign Application Priority Data

Mar. 15, 2019  (JP) ................................. 2019-048311
Mar. 15, 2019  (JP) ................................. 2019-048312
Dec. 12, 2019  (JP) ................................. 2019-224278

(51) Int. Cl.
*H02K 5/173*       (2006.01)
*F16C 19/52*       (2006.01)
(Continued)

(52) U.S. Cl.
CPC ............. *H02K 5/173* (2013.01); *F16C 19/52* (2013.01); *H02K 7/083* (2013.01); *H02K 11/30* (2016.01)

(58) Field of Classification Search
CPC .............................. H02K 5/173; H02K 7/083
See application file for complete search history.

(56) References Cited

U.S. PATENT DOCUMENTS

| | | | | |
|---|---|---|---|---|
| 1,804,600 A | * | 5/1931 | Rockwood | F16C 19/55 188/18 R |
| 2,488,825 A | * | 11/1949 | Palumbo | F16C 19/188 384/453 |
| 2,488,929 A | * | 11/1949 | Palumbo | F16C 19/50 384/461 |
| 3,365,596 A | * | 1/1968 | Jones | H02K 5/173 310/90 |

(Continued)

FOREIGN PATENT DOCUMENTS

| | | |
|---|---|---|
| CN | 104567966 A | 4/2015 |
| CN | 104865400 A | 8/2015 |

(Continued)

OTHER PUBLICATIONS

International Search Report for corresponding International Application No. PCT/JP2020/010194 mailed Apr. 21, 2020.
(Continued)

*Primary Examiner* — Robert W Horn
(74) *Attorney, Agent, or Firm* — Pearne & Gordon LLP

(57) ABSTRACT

A motor includes a rotor having a rotation shaft, a stator arranged oppositely in a circumferential direction of the rotor, and a pair of bearing portions rotatably supporting the rotation shaft, the pair of bearing portions each include a first bearing being rotatable together with the rotation shaft and a second bearing being rotatable together with the first bearing, the first bearing rotates together with the rotation shaft when the first bearing is normal, and the second bearing as well as the first bearing rotates together with the rotation shaft when the first bearing is abnormal.

12 Claims, 23 Drawing Sheets

(51) Int. Cl.
*H02K 7/08* (2006.01)
*H02K 11/30* (2016.01)

(56) References Cited

U.S. PATENT DOCUMENTS

| | | | |
|---|---|---|---|
| 4,733,152 A | 3/1988 | Allington | |
| 4,869,374 A | 9/1989 | Allington | |
| 5,998,894 A * | 12/1999 | Raad | H02K 7/083 |
| | | | 310/90 |
| 7,604,414 B2 * | 10/2009 | Verhoeven | H02K 5/1732 |
| | | | 384/613 |
| 2004/0074315 A1 * | 4/2004 | Hwang | F16C 19/522 |
| | | | 73/862.333 |
| 2018/0136282 A1 | 5/2018 | Alfermann | |
| 2022/0170507 A1 * | 6/2022 | Ohno | F16C 41/007 |
| 2022/0337118 A1 * | 10/2022 | Shirai | F16C 35/063 |

FOREIGN PATENT DOCUMENTS

| | | |
|---|---|---|
| CN | 205998830 U | 3/2017 |
| JP | S16-1384 Y1 | 2/1941 |
| JP | 49-140546 U | 1/1974 |
| JP | S62-282261 A | 12/1987 |
| JP | H03-238786 A | 10/1991 |
| JP | 04-125045 A | 4/1992 |
| JP | 09-273547 A | 10/1997 |
| JP | 2004-156779 A | 6/2004 |
| JP | 2015-231295 A | 12/2015 |
| KR | 20120057400 A | 6/2012 |

OTHER PUBLICATIONS

Written Opinion for corresponding International Application No. PCT/JP2020/010194 dated Apr. 21, 2020 and English translation.
International Preliminary Report on Patentability for corresponding International Application No. PCT/JP2020/010194 dated Sep. 16, 2021.
Office Action dated Feb. 1, 2023 for corresponding Japanese Application No. 2019-048311 and English translation.
Chinese Office Action dated Apr. 24, 2024 for corresponding Chinese Application No. 202080021662.0 and English translation.

* cited by examiner

MOTOR, MOTOR STATE DETECTION DEVICE, AND MOTOR STATE DETERMINATION DEVICE

TECHNICAL FIELD

The present invention relates to a motor, a motor state detection device, and a motor state determination device.

BACKGROUND ART

A cause of failure of a motor is an abnormality such as failure of bearings supporting a rotation shaft attached to a rotor.

In order to appropriately diagnose the presence or absence of a failure sign of the bearings of the motor, it has been known to provide a first temperature sensor for detecting the temperature of a first bearing provided on one end side of a shaft member of an electric motor, a second temperature sensor for detecting the temperature of a second bearing provided on another end side of the shaft member, and a bearing failure sign diagnosing means for diagnosing the presence or absence of a failure sign of the first bearing and the second bearing based on the difference between the temperature of the first bearing and the temperature of the second bearing (see Patent Literature 1).

DOCUMENT LIST

Patent Literature

Patent Literature 1: Japanese Patent Application Publication No. 2015-231295

SUMMARY OF INVENTION

Technical Problem

When abnormality of a bearing occurs in a motor, there occurs trouble in the rotation of a rotor and thus a need to replace the bearing. In particular, a motor for a cooling fan (hereinafter referred to as a fan motor) for cooling the interior of a server is required to have high reliability because if the fan motor fails, there also occurs trouble in the use of the server. High reliability of a bearing in a fan motor specifically means that the period of time until the occurrence of abnormality of the bearing, that is, the life of the bearing, is long, or that the life of the bearing can be predicted.

However, in the technique of Patent Literature 1, although the life of a bearing can be predicted, increasing the life of the bearing is not considered. In addition, in the technique of Patent Literature 1, since it is necessary to provide the temperature sensors to the two respective bearings, the structure of the motor is complex such as due to the necessity to provide spaces for attachment of the temperature sensors.

The present invention is for the above-described problem as an example, and it is an objective of the present invention to provide a technique that can improve the reliability of a bearing in a motor.

Solution to Problem

In order to achieve the above-mentioned objective, a motor according to the present invention includes: a rotor having a rotation shaft; a stator arranged oppositely in a circumferential direction of the rotor; and a pair of bearing portions rotatably supporting the rotation shaft, wherein the pair of bearing portions each include: a first bearing being rotatable together with the rotation shaft; and a second bearing being rotatable together with the first bearing, and the first bearing rotates together with the rotation shaft when the first bearing is normal, and the second bearing as well as the first bearing rotates together with the rotation shaft when the first bearing is abnormal.

In the motor according to one aspect of the present invention, the first bearing includes a first inner race being rotatable together with the rotation shaft, a first outer race provided on an outer periphery side of the first inner race, and a first rolling element arranged between the first inner race and the first outer race, and the second bearing includes a second inner race being rotatable together with the first outer race, a second outer race provided on an outer periphery side of the second inner race, and a second rolling element arranged between the second inner race and the second outer race.

In the motor according to one aspect of the present invention, the second bearing is provided at a position distanced from the first bearing in an axial line direction of the rotation shaft.

In the motor according to one aspect of the present invention, the second bearing is provided on an outer periphery side of the first bearing.

In the motor according to one aspect of the present invention, the pair of bearing portions each include a coupling portion rotatably coupling the first outer race and the second inner race.

In the motor according to one aspect of the present invention, the first bearing has a kinetic viscosity lower than a kinetic viscosity of the second bearing.

In the motor according to one aspect of the present invention, a bearing operation detecting unit detecting operation of the bearing portions is further included, the first bearing includes a first inner race being rotatable together with the rotation shaft, a first outer race provided on an outer periphery side of the first inner race, and a first rolling element arranged between the first inner race and the first outer race, the second bearing includes a second inner race being rotatable together with the first outer race, a second outer race provided on an outer periphery side of the second inner race, and a second rolling element arranged between the second inner race and the second outer race, and the bearing operation detecting unit outputs bearing operation information according to rotational operation of the first outer race.

In the motor according to one aspect of the present invention, the bearing operation detecting unit includes a bearing operation detecting magnet being rotatable together with the first outer race and a bearing operation detecting sensor outputting the bearing operation information according to rotational operation of the bearing operation detecting magnet.

In the motor according to one aspect of the present invention, a first base plate provided on an outer periphery side of the bearing portions is included, and the bearing operation detecting sensor is mounted to the first base plate.

In the motor according to one aspect of the present invention, the second bearing is provided at a position distanced from the first bearing in an axial line direction of the rotation shaft, and the pair of bearing portions each include a coupling portion rotatably coupling the first outer race and the second inner race.

In the motor according to one aspect of the present invention, the bearing operation detecting unit is provided on an outer periphery side of the coupling portion.

In the motor according to one aspect of the present invention, a second base plate arranged to sandwich the stator with the first base plate in an axial line direction of the rotation shaft, and a rotor operation detecting unit mounted to the second base plate and outputting rotor operation information according to rotational operation of the rotor are included.

In order to achieve the above-mentioned objective, in the motor according to the present invention, the pair of bearing portions each include a coupling portion coupling the first bearing and the second bearing to rotate in conjunction, and the coupling portions respectively included in the pair of bearing portions are coupled to rotate in conjunction.

In the motor according to one aspect of the present invention, the first bearing includes a first inner race being rotatable together with the rotation shaft, a first outer race provided on an outer periphery side of the first inner race, and a first rolling element arranged between the first inner race and the first outer race, the second bearing is provided at a position distanced from the first bearing in an axial line direction of the rotation shaft, and includes a second inner race being rotatable together with the first outer race, a second outer race provided on an outer periphery side of the second inner race, and a second rolling element arranged between the second inner race and the second outer race, and the coupling portion rotatably couples the first outer race and the second inner race.

In the motor according to one aspect of the present invention, a bearing operation detecting unit detecting operation of at least one of the pair of bearing portions is included, and the bearing operation detecting unit outputs bearing operation information according to rotational operation of the first outer race.

In the motor according to one aspect of the present invention, the bearing operation detecting unit includes a bearing operation detecting magnet being rotatable together with the first outer race and a bearing operation detecting sensor outputting the bearing operation information according to rotational operation of the bearing operation detecting magnet.

In the motor according to one aspect of the present invention, the bearing operation detecting sensor is mounted to a base plate provided on an outer periphery side of a bearing portion of the pair of bearing portions provided with the bearing operation detecting unit.

In the motor according to one aspect of the present invention, the bearing operation detecting unit is provided on an outer periphery side of the coupling portion.

In the motor according to one aspect of the present invention, a rotor operation detecting unit outputting rotor operation information according to rotational operation of the rotor is mounted to the base plate.

In order to achieve the above-mentioned objective, a motor state detection device according to the present invention is a device detecting a state of a bearing portion of a motor, the motor includes: a rotor having a rotation shaft; a stator arranged oppositely in a circumferential direction of the rotor; a pair of bearing portions rotatably supporting the rotation shaft and each including a first bearing being rotatable together with the rotation shaft, a second bearing being rotatable together with the first bearing, and a coupling portion coupling the first bearing and the second bearing to rotate in conjunction; a bearing operation detecting unit provided to at least one of the pair of bearing portions and outputting bearing operation information according to rotational operation of the first bearing, and the motor state detection device includes: an information acquiring unit acquiring rotation information, the rotation information being information based on rotational movement of the motor; and a state detecting unit detecting a state of rotational movement of the bearing portions based on the rotation information acquired by the information acquiring unit.

In the motor state detection device according to one aspect of the present invention, the rotation information is information on a rotational frequency of the rotor.

In the motor state detection device according to one aspect of the present invention, the rotation information is information on motor current of the motor.

In the motor state detection device according to one aspect of the present invention, it is determined whether the first bearing or the second bearing is rotating together with the rotation shaft in the bearing portions based on the rotation information.

In order to achieve the above-mentioned objective, a motor state determination device according to the present invention is a state determination device determining a state of a bearing portion of a motor, the motor includes: a first bearing including a first inner race being rotatable together with a rotation shaft of a rotor, a first outer race provided on an outer periphery side of the first inner race, and a first rolling element arranged between the first inner race and the first outer race and rotatably supporting the rotation shaft; a second bearing including a second inner race being rotatable together with the first outer race, a second outer race provided on an outer periphery side of the second inner race, and a second rolling element arranged between the second inner race and the second outer race; and a bearing operation detecting unit outputting bearing operation information according to rotational operation of the first outer race, and the state determination device includes a state determining unit determining a state of rotational movement of the first bearing based on the bearing operation information output by the bearing operation detecting unit.

In the motor state determination device according to one aspect of the present invention, the state determining unit determines whether the first bearing is degraded based on the bearing operation information.

In the motor state determination device according to one aspect of the present invention, the motor includes a rotor operation detecting unit outputting rotor operation information according to rotational operation of the rotor, and the state determining unit determines a state of rotational movement of the first bearing based on the bearing operation information and the rotor operation information.

In the motor state determination device according to one aspect of the present invention, the bearing operation information is information according to a rotational frequency of the first outer race, and the rotor operation information is information according to a rotational frequency of the rotor.

In the motor state determination device according to one aspect of the present invention, the state determining unit determines whether the first bearing is in failure based on information according to a rotational frequency of the first outer race and information according to a rotational frequent rotational frequency of the rotor.

In the motor state determination device according to one aspect of the present invention, a pair of bearing portions each including a coupling portion coupling the first bearing and the second bearing to rotate in conjunction is included, the coupling portion rotatably couples the first outer race and the second inner race, the bearing operation detecting unit is provided to at least one of the pair of bearing portions, and in the state determination device, the state determining unit determines a state of rotational movement of the pair of bearing portions based on the bearing operation information output by the bearing operation detecting unit.

In the motor state determination device according to one aspect of the present invention, the state determination device determines whether at least one of the pair of bearing portions is degraded based on the bearing operation information.

In the motor state determination device according to one aspect of the present invention, the bearing operation detecting unit is provided to one of the pair of bearing portions, and when one of the pair of bearing portions is degraded, it is determined that the first bearing included in either one of the pair of bearing portions is degraded by means of rotational operation of the coupling portion.

In the motor state determination device according to one aspect of the present invention, when the other of the pair of bearing portions is degraded, it is determined that the first bearing included in either one of the pair of bearing portions is degraded by means of rotational operation of the coupling portion.

In the motor state determination device according to one aspect of the present invention, the motor includes a rotor operation detecting unit outputting rotor operation information according to rotational operation of the rotor, and the state determining unit determines the state of rotational movement of the first bearing based on the bearing operation information and the rotor operation information.

In the motor state determination device according to one aspect of the present invention, the bearing operation information is information according to a rotational frequency of the first outer race, and the rotor operation information is information according to a rotational frequency of the rotor.

Effects of Invention

According to the present invention, it is possible to improve the reliability of a bearing in a motor.

DESCRIPTION OF EMBODIMENTS

Hereinafter, a motor, a motor state detection device, a motor state determination device according to embodiments of the present invention will be described with reference to the drawings.

<First Embodiment of Motor>

Figure 1:
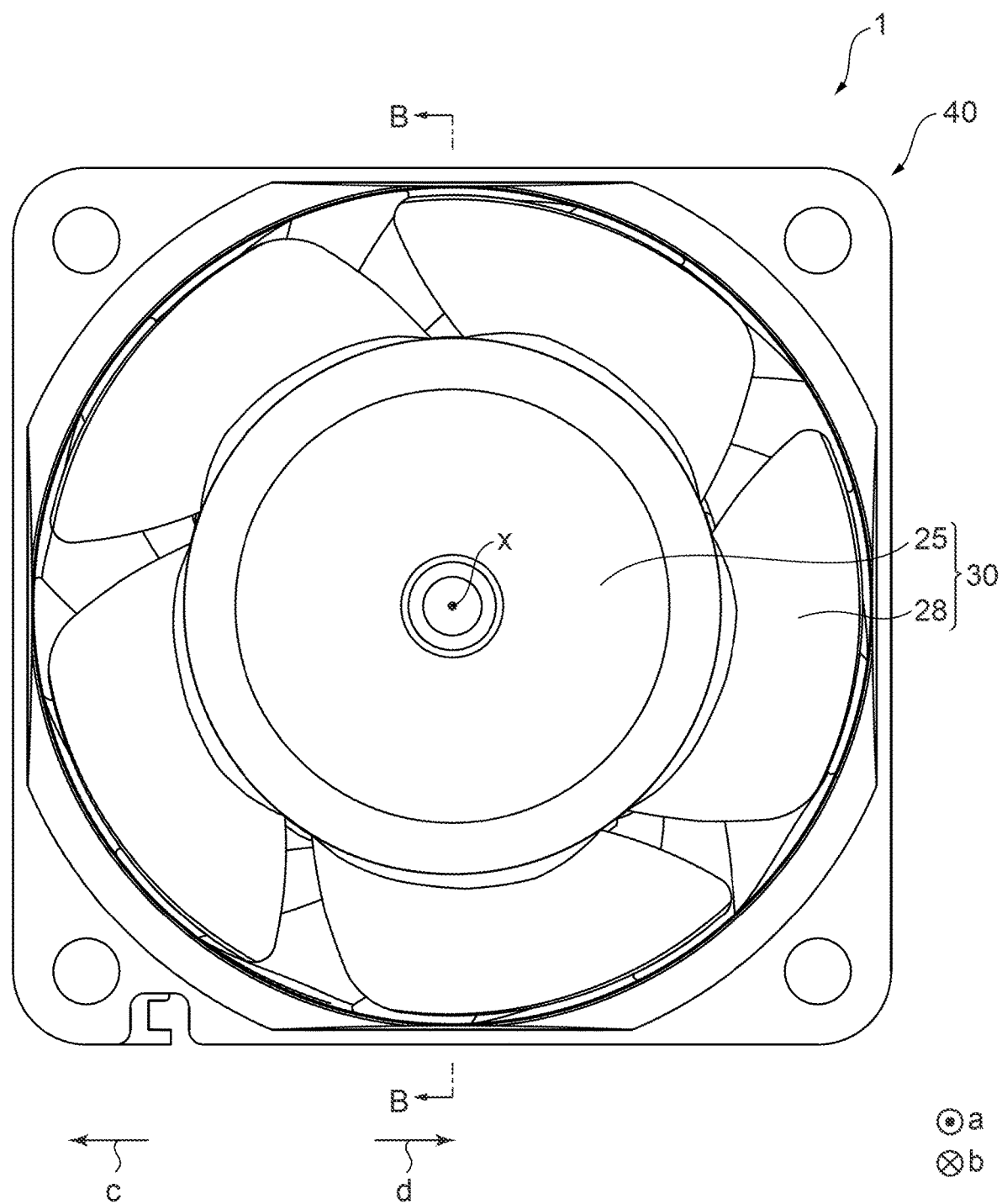
FIG. 1 A front view schematically showing configuration of a fan device including a motor of a first embodiment according to the present invention.
Figure 2:
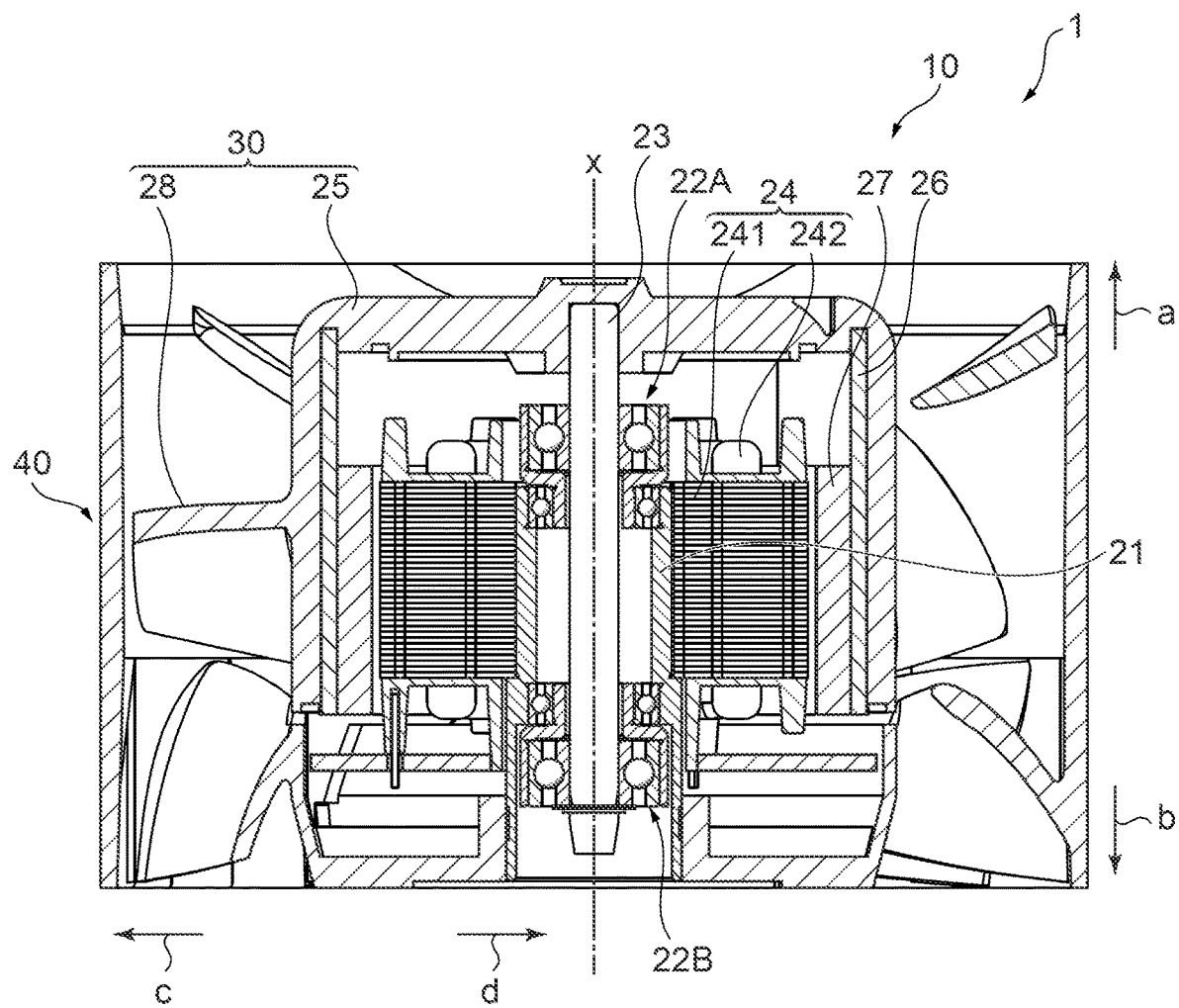
FIG. 2 A sectional view schematically showing configuration of the fan device shown in FIG. 1.
Figure 3:
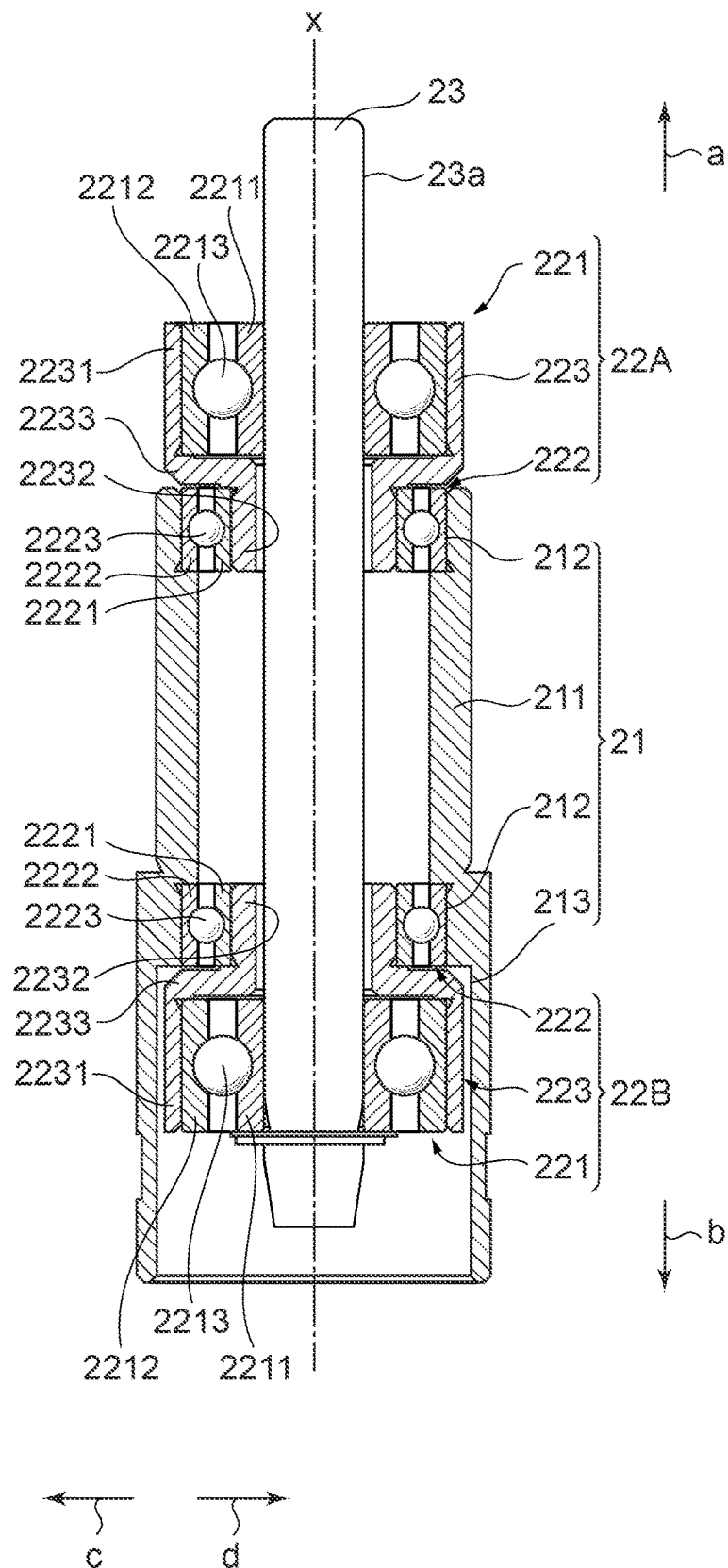
FIG. 3 A sectional view schematically showing configuration of a rotation shaft and bearing portions included in the fan device shown in FIG. 1.

FIG. 1 is a front view schematically showing configuration of a fan device 1 including a motor 10 of a first embodiment according to the present invention. FIG. 2 is a sectional view schematically showing configuration of the fan device 1. FIG. 3 is a sectional view schematically showing configuration of a rotation shaft 23 and bearing portions 22 included in the fan device 1.

In the following description, for convenience, it is assumed that the direction of arrow a in the axial line x direction is an upper side a and the direction of arrow b is a lower side b. It is also assumed that a direction away from the axial line x in the radial direction perpendicular to the axial line x (the direction of arrow c in FIG. 1) is an outer periphery side c and a direction toward the axial line x (the direction of arrow d in FIG. 1) is an inner periphery side d. In the following description, for convenience, it is assumed that the direction indicated in FIG. 1 is toward a side surface of the motor. In the following description, for convenience, it is also assumed that the direction of seeing the motor from the upper side a toward the lower side b is toward a front surface and the direction of seeing the motor from the lower side b toward the upper side a is toward a bottom surface.

As shown in FIGS. 1 to 3, the motor 10 according to the present embodiment is provided to the fan device 1 and includes a rotor having the rotation shaft 23, a stator 24 arranged oppositely in the circumferential direction of the rotor, and a pair of bearing portions 22A and 22B rotatably supporting the rotation shaft 23, the pair of bearing portions 22A and 22B each include a first bearing 221 being rotatable together with the rotation shaft 23 and a second bearing 222 being rotatable together with the first bearing 221, the first bearing 221 rotates together with the rotation shaft 23 when the first bearing 221 is normal, and the second bearing 222 as well as the first bearing 221 rotates together with the rotation shaft 23 when the first bearing 221 is abnormal. Hereinafter, configuration and operation of the fan device 1 including the motor 10 will be specifically described.

[Configuration of Fan Device]

As shown in FIG. 1, the fan device 1 includes an impeller 30 including a plurality of blades 28 at a hub 25 and a casing 40 covering the outer periphery of the impeller 30 and defining the outer shape of the fan device 1. In the impeller 30, the hub 25 is arranged at a central portion around the axial line x inside the casing 40. As shown in FIG. 2, in the fan device 1, the motor 10 is arranged inside the hub 25 of the impeller 30.

The motor 10 is, for example, an outer rotor-type brushless DC (Direct Current) motor in which the rotation shaft 23 as well as a rotor yoke 26 and the impeller 30 connected to the rotation shaft 23 form the rotor. The motor 10 includes the rotation shaft 23, a bearing housing 21, the pair of bearing portions 22A and 22B, the stator 24, the rotor yoke 26, and a magnet 27.

As shown in FIGS. 2 and 3, the rotation shaft 23 is a rod-shaped member arranged such that the longitudinal direction of the rotation shaft 23 is the axial line x direction. The bearing housing 21 is a hollow cylindrical body supported at a central portion of the casing 40. The bearing housing 21 rotatably supports the rotation shaft 23 via the pair of bearing portions 22A and 22B. The bearing housing 21 includes a bearing supporting portion 212 supporting the bearing portion 22A at one end of a cylindrical housing body 211 in the axial line x direction and a bearing supporting portion 213 supporting the bearing portion 22B at another end of the housing body 211 in the axial line x direction. The bearing supporting portions 212 and 213 are each formed on the inner peripheral surface of the housing body 211.

The pair of bearing portions 22A and 22B are specifically the bearing portion 22A supported by the bearing supporting portion 212 provided at one end of the bearing housing 21 in the axial line x direction and the bearing portion 22B supported by the bearing supporting portion 213 provided at another end of the bearing housing 21 in the axial line x direction, as described above. The pair of bearing portions 22A and 22B each include the first bearing 221, the second bearing 222, and a coupling portion 223. As shown in FIG. 3, in each of the pair of bearing portions 22A and 22B, the second bearing 222 is provided at a position distanced from the first bearing 221 in the axial line x direction of the rotation shaft 23.

The first bearing 221 includes a first inner race 2211, a first outer race 2212, and first rolling elements 2213. The first inner race 2211 is an annular member having an inner peripheral surface that can be fitted to an outer circumferential surface 23a of the rotation shaft 23. The first inner race 2211 is rotatable together with the rotation shaft 23 when fitted to the outer circumferential surface 23a of the rotation shaft 23. The first outer race 2212 is provided on the outer periphery side c of the first inner race 2211. The first outer race 2212 is an annular member being coaxial with the first inner race 2211 and having a larger diameter than that of the first inner race 2211. The first rolling elements 2213 are a plurality of spherical members arranged between the first inner race 2211 and the first outer race 2212. In the first bearing 221, lubricant is infused between the first inner race 2211, the first outer race 2212, and the first rolling elements 2213.

The second bearing 222 includes a second inner race 2221, a second outer race 2222, and second rolling elements 2223. The second inner race 2221 is an annular member having an inner peripheral surface that can be fitted to the coupling portion 223. The second inner race 2221 is rotatable together with the first outer race 2212 via the coupling portion 223 when fitted to the coupling portion 223. The second outer race 2222 is provided on the outer periphery side c of the second inner race 2221. The second outer race 2222 is an annular member being coaxial with the second inner race 2221 and having a larger diameter than that of the second inner race 2221. The second rolling elements 2223 are a plurality of spherical members arranged between the second inner race 2221 and the second outer race 2222. In the second bearing 222, lubricant is infused between the second inner race 2221, the second outer race 2222, and the second rolling elements 2223.

The first bearing 221 and the second bearing 222 have different kinetic viscosities from each other such as due to difference in the coefficients of mechanical friction of the components and the viscosities of the lubricants used in the first bearing 221 and the second bearing 222. In the present embodiment, for example, the first bearing 221 has a kinetic viscosity lower than the kinetic viscosity of the second bearing 222.

The coupling portion 223 includes a first bearing accommodating part 2231, a second bearing accommodating part 2232, and a step portion 2233. The coupling portion 223 rotatably couples the first outer race 2212 and the second inner race 2221 by the first bearing accommodating part 2231 and the second bearing accommodating part 2232, which are cylindrical portions having different radial dimensions, and the step portion 2233 connecting the first bearing accommodating part 2231 and the second bearing accommodating part 2232.

The first bearing accommodating part 2231 has an inner peripheral surface that can accommodate the first outer race 2212 of the first bearing 221. Specifically, the first bearing accommodating part 2231 is formed to have a shape and dimension that is rotatable in cooperation with the first outer race 2212.

The second bearing accommodating part 2232 has an inner peripheral surface having a shape and dimension to have a predetermined air gap from the outer circumferential surface 23a of the rotation shaft 23. In addition, the second bearing accommodating part 2232 has an outer circumferential surface that can accommodate the second inner race 2221 of the second bearing 222. The second bearing accommodating part 2232 is formed to have a shape and dimension that is rotatable in cooperation with the second inner race 2221.

The stator 24 is fixed on the lower side b, for example, of the casing 40. The stator 24 includes, for example, a stator core 241 formed by laminating a plurality of electromagnetic steel plates, an insulator provided to the stator core 241, and a coil 242 wound on the stator core 241 via the insulator.

The rotor yoke 26 is provided on the inner periphery portion of the hub 25 of the impeller 30, for example. The rotor yoke 26 is formed in a generally tubular shape, for example, for accommodating the magnet 27. The rotor yoke 26 may be formed separately from or integrally with the hub 25. The magnet 27 is attached to the inner peripheral surface of the rotor yoke 26. The magnet 27 is provided to have a predetermined gap from the stator 24 provided on the inner periphery side d.

[Operation of Fan Device]

Next, operation of the fan device 1 having the above-described configuration will be described.

Figure 4:
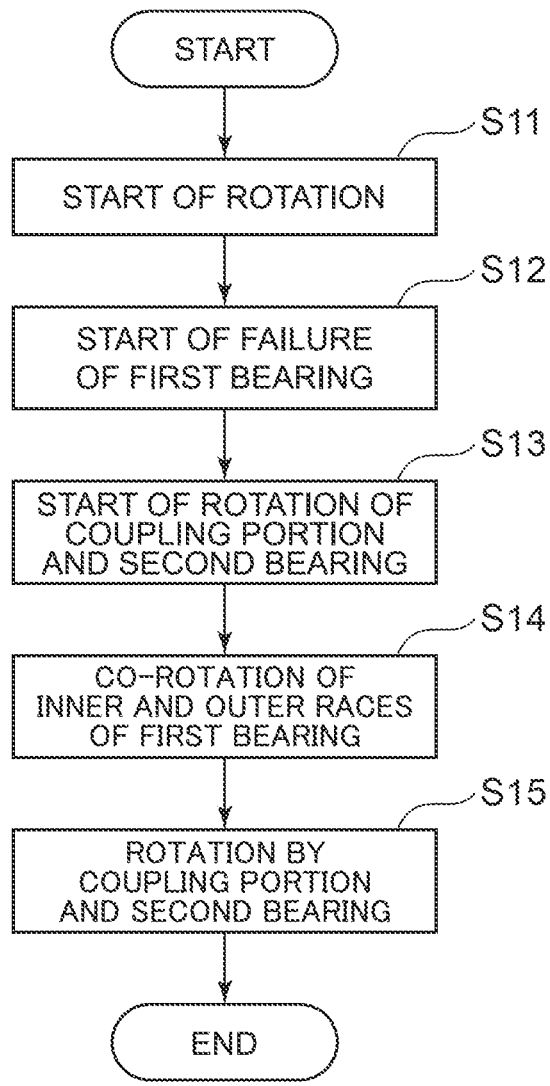
FIG. 4 A flow chart for showing transition of operations of the bearing portions of the motor included in the fan device shown in FIG. 1.

FIG. 4 is a flow chart for showing transition of operations of the bearing portions 22A and 22B of the motor 10 included in the fan device 1. As shown in FIG. 4, in the motor 10, rotation of the rotation shaft 23 starts when driving current flows (step S11). As shown in FIGS. 2 and 3, the rotation shaft 23 of the motor 10 is rotatably supported by the pair of bearing portions 22A and 22B fitted to the bearing housing 21. In addition, one end of the rotation shaft 23 on the upper side a is coupled to the hub 25 of the impeller 30. Thus, when the motor 10 is driven, the rotation shaft 23 rotates about the axial line x, and the impeller 30 also rotates about the axial line x in association.

Here, in the motor 10, the pair of bearing portions 22A and 22B each include the first bearing 221 being rotatable together with the rotation shaft 23 and the second bearing 222 being rotatable together with the first bearing 221. Here, in the pair of bearing portions 22A and 22B, the kinetic viscosity of the first bearing 221 and the kinetic viscosity of the second bearing 222 are different. That is, in the motor 10, one of the first bearing 221 and the second bearing 222 that has a lower kinetic viscosity (for example, the first bearing 221) rotates more easily due to the difference in kinetic viscosity between the two bearings (the first bearing 221 and the second bearing 222) included in each of the pair of bearing portions 22A and 22B. In the bearing portions 22A and 22B of the motor 10 configured in this manner, in a regular state (during a predetermined time after starting operation), the first bearing 221 having a lower kinetic viscosity has a normal operational function, and thus the first inner race 2211 is supported by the first rolling elements 2213 and the first outer race 2212 and rotates together with the rotation shaft 23. Such a state where the first inner race 2211 is supported by the first rolling elements 2213 and the first outer race 2212 and rotates together with the rotation shaft 23 in the first bearing 221 is referred to as a normal state.

Thereafter, in the bearing portions 22A and 22B in the motor 10, when the operational function of the first bearing 221 is degraded or starts to fail, the coefficient of friction of the first bearing 221 rises (step S12). Such a state where degradation or failure of the operational function of the first bearing 221 occurs to cause abnormality and the coefficient of friction rises is referred to as an abnormal state. In the bearing portions 22A and 22B, when the rotational torque of the first bearing 221 exceeds a starting torque of the second bearing 222, the coupling portion 223 and the second bearing 222 start to rotate (step S13). Specifically, in the bearing portions 22A and 22B, the first inner race 2211, the first outer race 2212, and the first rolling elements 2213 of the first bearing 221 integrally rotate together with the rotation shaft 23. In the coupling portion 223, the inner peripheral surface of the first bearing accommodating part 2231 is connected to be rotatable together with the first outer race 2212 of the first bearing 221. In such a state where the first outer race 2212 rotates together with the first inner race 2211 in the first bearing 221, the second bearing 222 starts rotation (co-rotation) together with the rotation shaft 23 via the coupling portion 223 (step S14). That is, the second inner race 2221 of the second bearing 222 is attached to the outer circumferential surface of the second bearing accommodating part 2232 of the coupling portion 223 and thus can rotate in association with the rotation of the coupling portion 223. Thus, in the motor 10, the coupling portion 223 and the second bearing 222 rotate together with the rotation shaft 23 (step S15).

With the motor 10 configured as described above and the fan device 1 including the motor 10, since the rotation shaft 23 is supported by the pair of bearing portions 22A and 22B including the first bearing 221 and the second bearing 222 having different kinetic viscosities, it is possible to continue operation without replacing bearing components even when the first bearing 221 is in an abnormal state such as degradation or failure. That is, with the motor 10 configured as described above and the fan device 1 including the motor 10, it is possible to increase the life of the bearings even in an application in which constant operation is performed and timing for maintenance such as component replacement is limited, such as a cooling fan for a server, for example.

Figure 5:
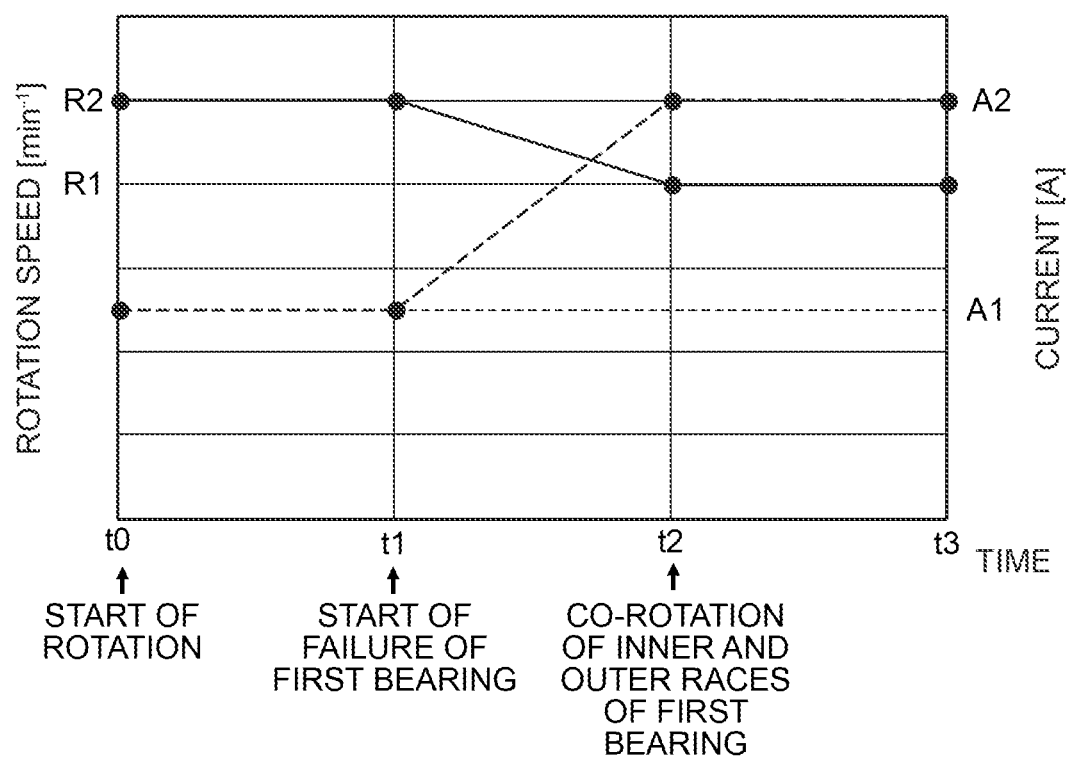
FIG. 5 A schematic diagram showing transition of the rotational speed and motor current of the motor included in the fan device shown in FIG. 1.

FIG. 5 is a schematic diagram showing transition of the rotational speed and motor current of the motor 10 included in the fan device 1. FIG. 5 shows change in the values of the rotational speed and motor current of the motor 10 in association with degradation of the bearing portions 22A and 22B from the start of the operation of the motor 10. In FIG. 5, there are shown t0: the time of start of the operation of the motor 10, t1: the time at which the first bearing 221 is no longer in a normal operational state (start of failure of the first bearing 221), and t2: the time at which the first bearing 221 together with the coupling portion 223 starts to rotate integrally with the rotation shaft 23 (co-rotation of the inner and outer races of the first bearing 221). As shown in FIG. 5, in the period of time from t0 to t1, the motor 10 is operated with a rotational speed of R2 and a motor current value of A1 since the first bearing 221 is in normal operation. However, in the period of time until t2 after t1, in the motor 10, the first bearing 221 is degraded and the rotational torque of the first bearing 221 gradually increases, and thus the rotational speed decreases from R2 and the motor current value rises from A1. After t2, when the rotational torque of the first bearing 221 exceeds the starting torque of the second bearing 222, the second bearing 222 operates in the bearing portions 22A and 22B, and thus the rotational speed becomes R1 and the motor current value becomes A2.

With the motor 10 and the fan device 1 including the motor 10 configured as described above, since the rotation shaft 23 is supported by the pair of bearing portions 22A and 22B including the first bearing 221 and the second bearing 222 having different kinetic viscosities, it is possible to easily recognize which of the first bearing 221 or the second bearing 222 is operating in the bearing portions 22A and 22B by measuring the rotational speed and motor current of the motor 10, for example. That is, with the motor 10 configured as described above and the fan device 1 including the motor 10, it is possible to easily recognize the operational state of the bearing portions 22A and 22B and thus predict the replacement timing and life of the bearing portions 22A and 22B.

Therefore, with the motor 10 configured as described above and the fan device 1 including the motor 10, it is possible to improve the reliability of the bearings.

In addition, with the motor 10 and the fan device 1 including the motor 10, it is possible to transmit the rotation of the rotation shaft 23 to the second bearing 222 by means of the coupling portion 223 when the first bearing 221 is degraded, and thus improve the reliability of the bearings. In addition, since the coupling portion 223 does not transmit the rotation to the second bearing 222 when the first bearing 221 is in normal operation, it is possible to improve the reliability of the bearings without causing loss in the bearing portions 22A and 22B.

<Motor State Detection Device of First Embodiment>

Next, a motor state detection device of the first embodiment will be described.

In the present embodiment, a driving control device 3 of the motor 10 functions as a state detection device that detects the state of the bearing portions 22A and 22B of the motor 10. The driving control device 3 includes a rotational frequency calculating unit 32 as an information acquiring unit that acquires rotation information, which is information based on rotational movement of the motor 10, and a bearing abnormality determining unit 35 as a state detecting unit that detects the state of rotational movement of the bearing portions 22A and 22B based on the rotation information acquired by the rotational frequency calculating unit 32. Hereinafter, the driving control device 3 of the motor 10 functioning as a motor state detection device will be described.

Figure 6:
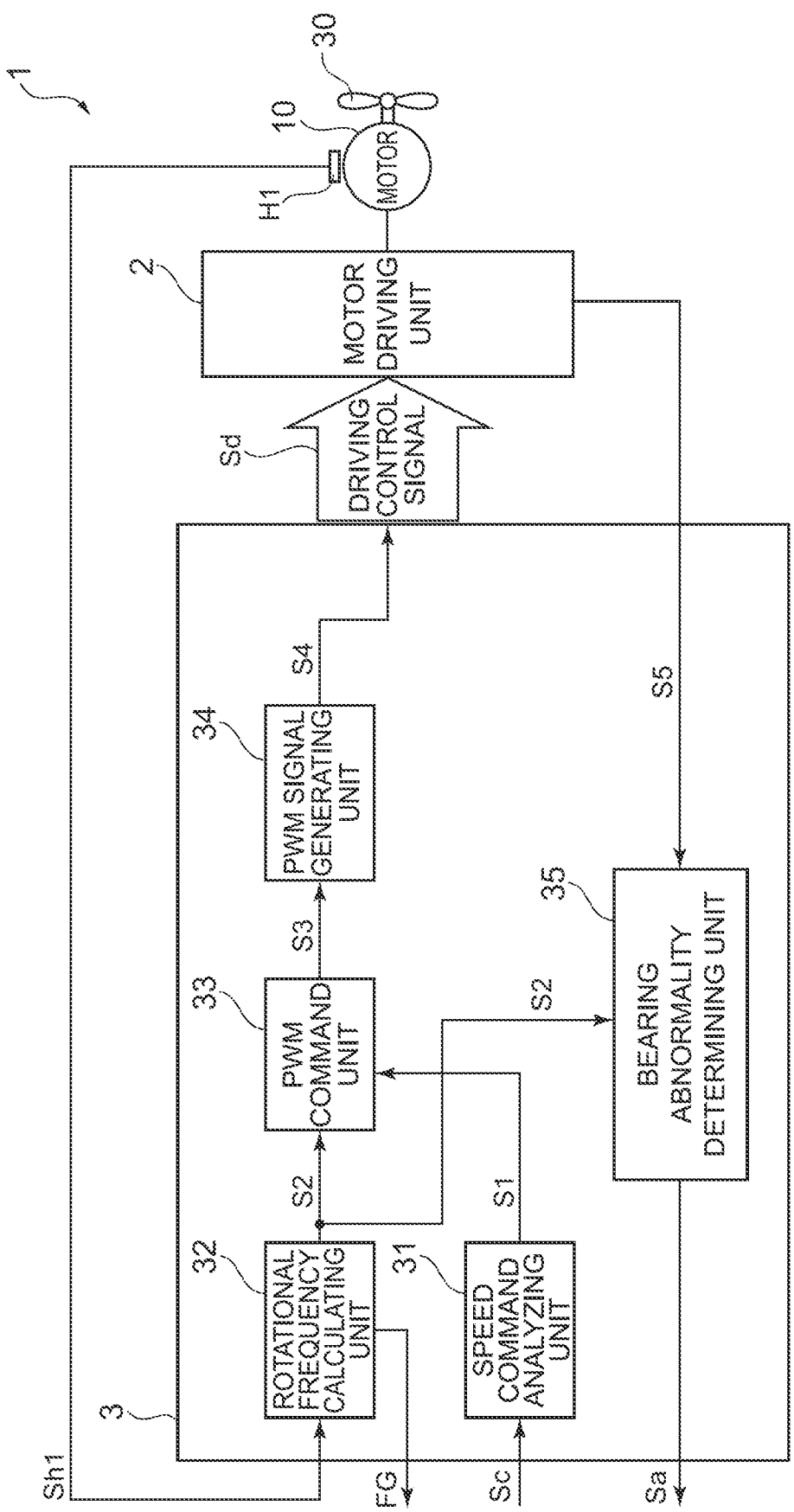
FIG. 6 A functional block diagram of a driving control device of the motor according to the embodiment of the present invention.

FIG. 6 is a functional block diagram of the driving control device 3 of the motor 10 according to the embodiment of the present invention. As shown in FIG. 6, the driving control device 3 of the motor 10 includes a speed command analyzing unit 31, the rotational frequency calculating unit 32, a PWM (Pulse Width Modulation) command unit 33, a PWM signal generating unit 34, and the bearing abnormality determining unit 35. The driving control device 3 is realized by, for example, an information processing device capable of executing various computer programs including a program for realizing the following functional blocks of the driving control device 3 according to the present invention, such as an MCU (Micro Controller Unit), and a storage device such as a ROM (Read-Only Memory) for storing the computer programs, data for executing the programs, and the like. The ROM also stores information on predetermined values for the rotation information used for the processing of the bearing abnormality determining unit 35, which will be described later.

The speed command analyzing unit 31 receives a speed command signal Sc for the motor 10 from external equipment (not shown) such as a control unit of a server, and generates a target rotational frequency signal S1 for providing an indication to the PWM command unit 33.

The rotational frequency calculating unit 32 acquires a first Hall signal Sh1 (information on a rotational frequency) acquired by a Hall sensor H1 attached to the motor 10 and provided to detect the rotational frequency of the rotor (the rotation shaft 23 or the impeller 30) as actual rotation information of the rotor, and calculates the rotational frequency of the rotor. The rotational frequency calculating unit 32 outputs a rotational frequency signal S2 to the PWM command unit 33 and the bearing abnormality determining unit 35. In addition, the rotational frequency calculating unit 32 outputs the calculated rotational frequency of the rotor to the external equipment as an FG (Frequency Generator) signal.

The PWM command unit 33 outputs, to the PWM signal generating unit 34, a PWM setting indication signal S3 generated based on the target rotational frequency signal S1 output from the speed command analyzing unit 31 and the rotational frequency signal S2 output from the rotational frequency calculating unit 32. The PWM setting indication signal S3 is a signal indicating setting of a PWM signal to be generated by the PWM signal generating unit 34, that is, the duty cycle of a PWM signal required to drive the motor 10 at a desired rotational frequency.

The PWM signal generating unit 34 generates and outputs a driving control signal Sd for controlling a motor driving unit 2, that is, a PWM signal S4 having a desired duty cycle based on the PWM setting indication signal S3 output by the PWM command unit 33.

The motor driving unit 2 drives the motor 10 based on the driving control signal Sd. In addition, the bearing abnormality determining unit 35 acquires a current signal S5, which is information on the motor current flowing in the motor driving unit 2 as an example of rotation information of the motor.

The bearing abnormality determining unit 35 functions as an information acquiring unit that acquires rotation information, which is information based on rotational movement of the motor 10, and a state detecting unit that detects the state of rotational movement of the bearing portions 22A and 22B based on the rotation information acquired by the information acquiring unit. Specifically, the bearing abnormality determining unit 35 determines whether the first bearing 221 or the second bearing 222 is rotating together with the rotation shaft 23 in the bearing portions 22A and 22B based on at least one of the rotational frequency signal S2 and the current signal S5, which are the rotation information, and detects whether an abnormal state such as degradation or failure of the first bearing 221 of the bearing portions 22A and 22B is occurring. When detecting abnormality of the bearing portions 22A and 22B, the bearing abnormality determining unit 35 outputs information indicating the abnormal state of the bearing portions 22A and 22B to the external equipment as an abnormality reporting signal Sa.

Figure 7:
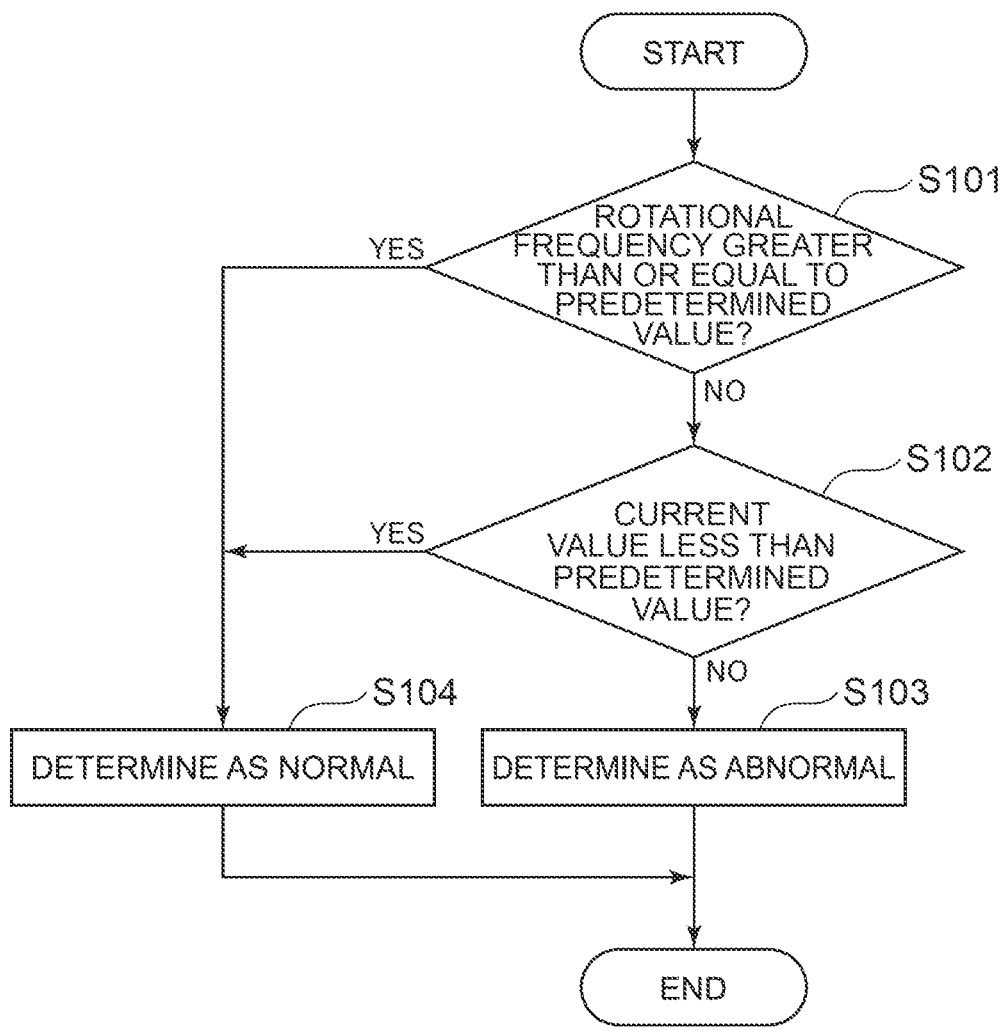
FIG. 7 A flow chart for showing an example of a state detection process for bearing portions by the driving control device of the motor shown in FIG. 6.

FIG. 7 is a flow chart for showing an example of a state detection process for the bearing portions 22A and 22B by the driving control device 3 of the motor 10. In the example of the state detection process for the bearing portions 22A and 22B by the driving control device 3 shown in FIG. 7, the bearing abnormality determining unit 35 detects the state of the bearing portions 22A and 22B based on the rotational frequency signal S2, which is information on the rotational frequency of the motor, and the current signal S5, which is information on the motor current flowing in the motor driving unit 2, as the rotation information. As shown in FIG.

7, in the driving control device 3, the bearing abnormality determining unit 35 determines whether the rotational frequency of the motor is greater than or equal to a predetermined value, for example, R1 shown in FIG. 5, based on the rotational frequency signal S2 output by the rotational frequency calculating unit 32 (S101).

If the rotational frequency of the motor is less than or equal to the predetermined value (step S101: NO), the bearing abnormality determining unit 35 determines whether the motor current flowing in the motor 10 is less than a predetermined value, for example, A2 shown in FIG. 5, based on the current signal S5, which is information on the motor current flowing in the motor driving unit 2 (step S102).

If the motor current flowing in the motor 10 exceeds the predetermined value (step S102: NO), the bearing abnormality determining unit 35 determines that the first bearing 221 of the bearing portions 22A and 22B is in an abnormal state of being degraded (step S103). As shown in FIG. 45, when the first bearing 221 is degraded, the rotational torque of the first bearing 221 gradually increases, and thus the rotational speed decreases from the normal state and the motor current also rises from the normal state. Thus, the bearing abnormality determining unit 35 can detect that both of the rotational speed and motor current of the motor 10 are changed from the normal numerical values to detect the abnormal state, that is, life of the bearing portions 22A and 22B.

On the other hand, if the rotational frequency of the motor 10 is greater than or equal to the predetermined value (step S101: YES) or the motor current of the motor 10 is less than the predetermined value (step S102: YES), the bearing abnormality determining unit 35 determines that the first bearing 221 of the bearing portions 22A and 22B is in normal operation (step S104).

Figure 8:
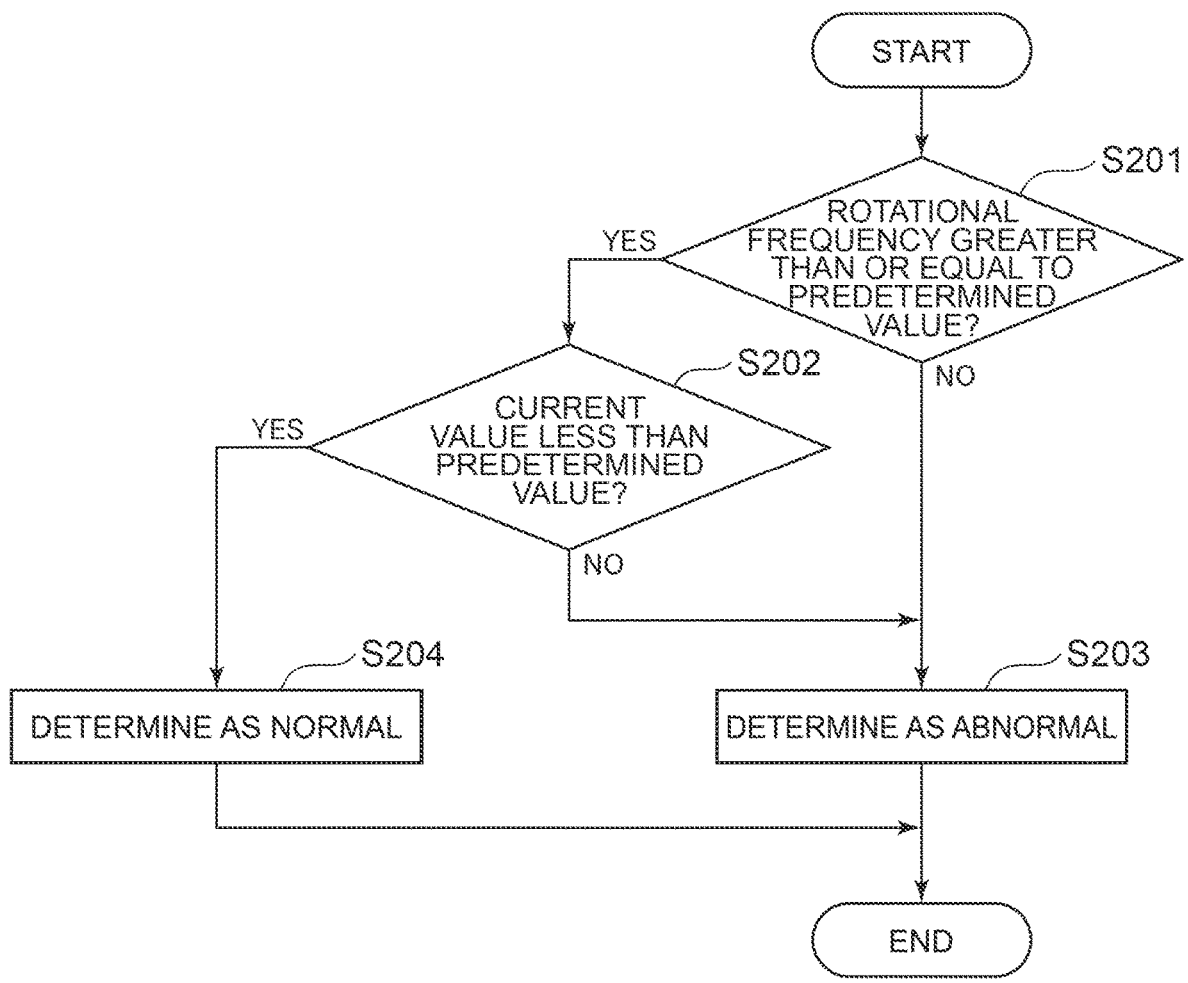
FIG. 8 A flow chart for showing a variation of the state detection process for the bearing portions by the driving control device of the motor shown in FIG. 6.

FIG. 8 is a flow chart for showing a variation of the state detection process for the bearing portions 22A and 22B by the driving control device 3 of the motor 10. In the variation of the state detection process for the bearing portions 22A and 22B by the driving control device 3 shown in FIG. 8, the bearing abnormality determining unit 35 detects the state of the bearing portions 22A and 22B based on either information of the rotational frequency signal S2, which is information on the rotational frequency of the motor, or the current signal S5, which is information on the motor current flowing in the motor driving unit 2, as the rotation information. As shown in FIG. 8, in the driving control device 3, the bearing abnormality determining unit 35 determines whether the rotational frequency of the motor is greater than or equal to a predetermined value, for example, R1 shown in FIG. 5, based on the rotational frequency signal S2 output by the rotational frequency calculating unit 32 (step S201).

If the rotational frequency of the motor 10 is greater than or equal to the predetermined value (step S201: YES), the bearing abnormality determining unit 35 determines whether the motor current flowing in the motor 10 is less than a predetermined value, for example, A2 shown in FIG. 5, based on the current signal S5, which is information on the motor current flowing in the motor driving unit 2 (step S202).

If the rotational frequency of the motor 10 is less than or equal to the predetermined value (step S201: NO) or the motor current flowing in the motor 10 exceeds the predetermined value (step S202: NO), the bearing abnormality determining unit 35 determines that the first bearing 221 of the bearing portions 22A and 22B is in an abnormal state of being degraded (S203). In the variation, in a manner similar to the example previously described, the bearing abnormality determining unit 35 can detect that both of the rotational speed and motor current of the motor 10 are changed from the normal values to detect the abnormal state, that is, life of the bearing portions 22A and 22B.

On the other hand, if the motor current of the motor 10 is less than the predetermined value (step S202: YES), the bearing abnormality determining unit 35 determines that the first bearing 221 of the bearing portions 22A and 22B is in normal operation (step S204).

With the driving control device 3 of the motor 10 configured as described above, since the operational state of the bearing portions 22A and 22B is determined based on the rotation information of the motor 10 in which the rotation shaft 23 is supported by the pair of bearing portions 22A and 22B including the first bearing 221 and the second bearing 222 having different kinetic viscosities, for example, the rotation information obtained by measuring at least one of the rotational speed and motor current of the motor 10, it is possible to easily determine which of the first bearing 221 or the second bearing 222 is operating in the bearing portions 22A and 22B, that is, the operational state of the bearing portions 22A and 22B. That is, with the driving control device 3 of the motor 10 configured as described above, it is possible to easily determine the operational state of the bearing portions 22A and 22B of the motor 10 and thus predict the replacement timing and life of the bearing portions 22A and 22B.

Therefore, with the driving control device 3 of the motor 10 configured as described above, it is possible to improve the reliability of the bearings.

<Second Embodiment of Motor>

Next, a second embodiment of a motor according to the present invention will be described. Note that components of the motor according to the present embodiment similar to those of the motor 10 previously described are given by the same reference characters, and descriptions of these components will be omitted.

Figure 9:
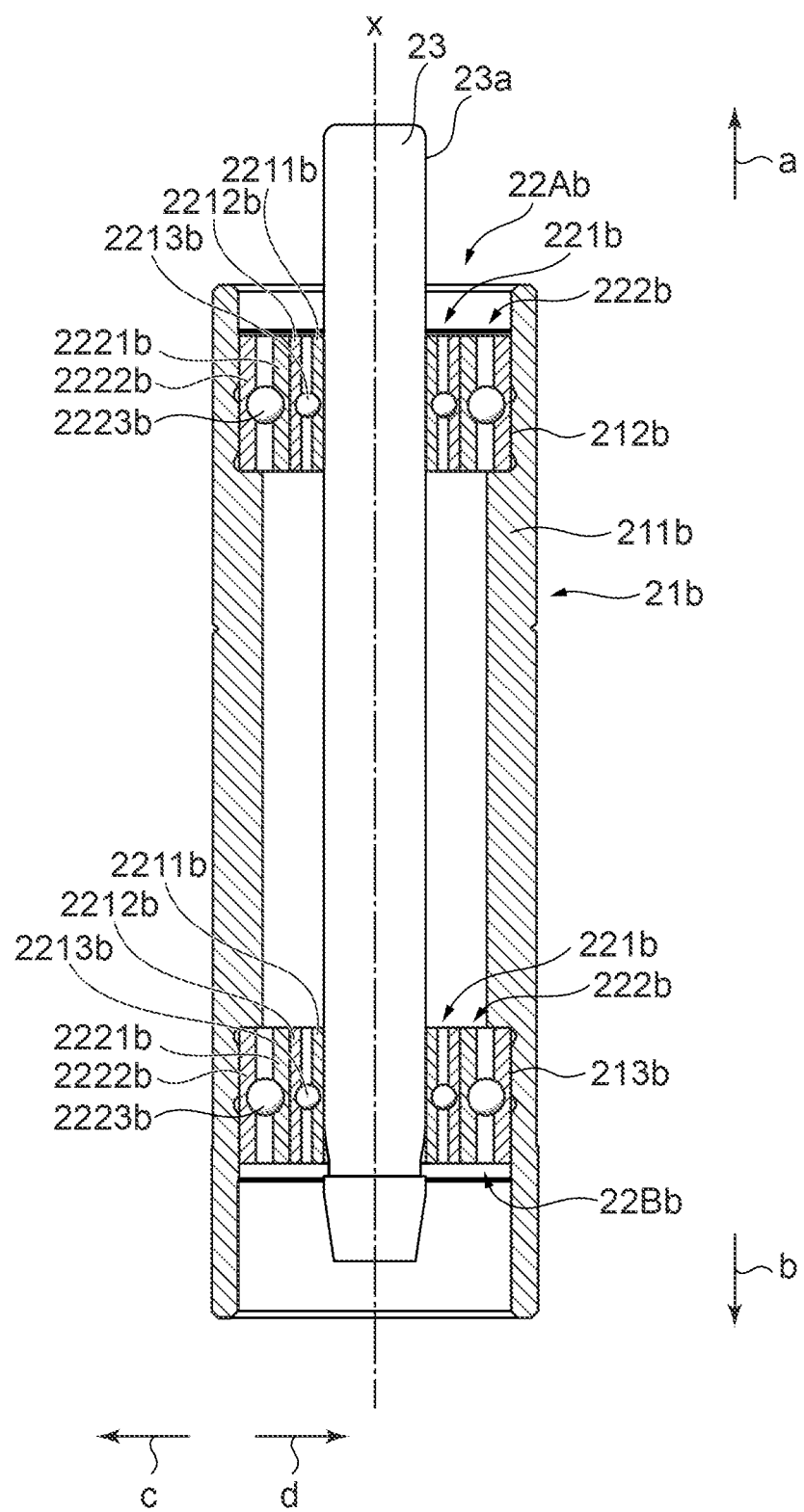
FIG. 9 A sectional view schematically showing configuration of a rotation shaft and bearing portions included in a motor according to a second embodiment of the present invention.

FIG. 9 is a sectional view schematically showing configuration of the rotation shaft 23 and bearing portions 22Ab and 22Bb included in the motor according to the second embodiment of the present invention.

As shown in FIG. 9, in the pair of bearing portions 22Ab and 22Bb included in the motor according to the second embodiment, in a manner similar to the pair of bearing portions 22A and 22B previously described, the bearing portion 22Ab is supported by a bearing supporting portion 212b provided at one end of a bearing housing 21b in the axial line x direction, and the bearing portion 22Bb is supported by a bearing supporting portion 213b provided at another end of the bearing housing 21b in the axial line x direction.

The pair of bearing portions 22Ab and 22Bb included in the motor according to the second embodiment are different from the pair of bearing portions 22A and 22B previously described in that a first bearing 221b and a second bearing 222b of the bearing portions 22Ab and 22Bb are arranged at positions along a direction perpendicular to the axial line x direction of the rotation shaft 23. That is, in the pair of bearing portions 22Ab and 22Bb, the second bearing 222b is provided on the radially outer side of the first bearing 221b, that is, on the outer periphery side c of the first bearing 221b. Since the first bearing 221b and the second bearing 222b are arranged in the above-described manner, the pair of bearing portions 22Ab and 22Bb are different from the pair of bearing portions 22A and 22B previously described in that a first outer race 2212b of the first bearing 221b and a second inner race 2221*b* of the second bearing 222*b* contact each other. Also, the pair of bearing portions 22Ab and 22Bb are different from the pair of bearing portions 22A and 22B previously described in that there is no coupling portion 223 connecting the first outer race 2212 and the second inner race 2221 since the first outer race 2212*b* of the first bearing 221*b* and the second inner race 2221*b* of the second bearing 222*b* contact each other and are configured to be rotatable together.

With the motor and the fan device including the bearing portions 22Ab and 22Bb configured as described above, since the rotation shaft 23 is supported by the pair of bearing portions 22Ab and 22Bb including the first bearing 221*b* and the second bearing 222*b* having different kinetic viscosities, it is possible to continue operation without replacing bearing components even when the first bearing 221*b* is degraded or fails. That is, with the motor and the fan device including the bearing portions 22Ab and 22Bb configured as described above, it is possible to increase the life of the bearings even in an application in which constant operation is performed and timing for maintenance such as component replacement is limited, such as a cooling fan for a server, for example.

Therefore, with the motor and the fan device including the bearing portions 22A and 22B configured as described above, it is possible to improve the reliability of the bearings.

<Third Embodiment of Motor>

Next, a fan device 1C including a motor 10C of a third embodiment according to the present invention will be described. Note that components of the motor 10C according to the present embodiment similar to those of the motor 10 previously described are given by the same reference characters, and descriptions of these components will be omitted.

Figure 10:
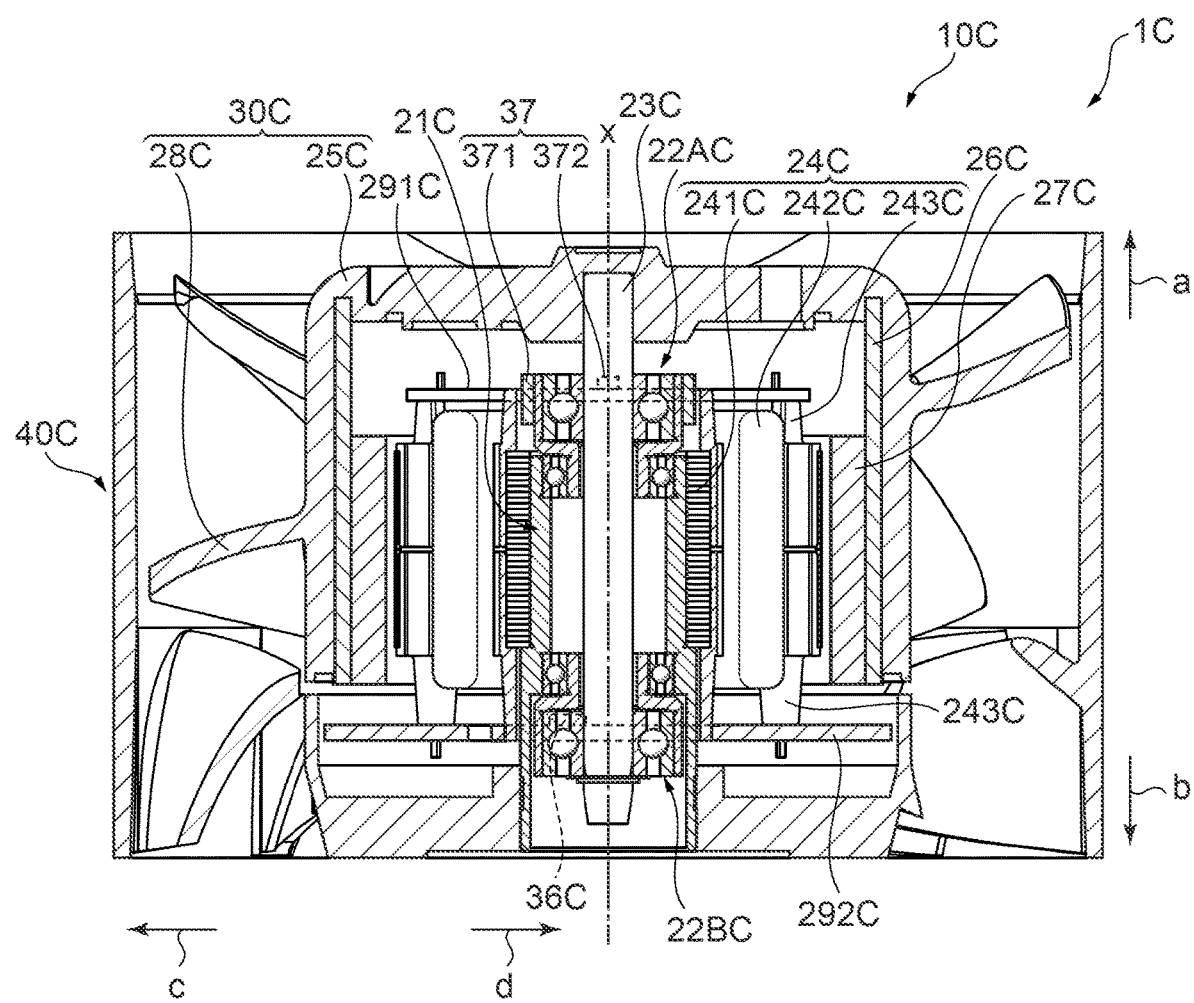
FIG. 10 A sectional view schematically showing configuration of a fan device including a motor of a third embodiment according to the present invention.
Figure 11:
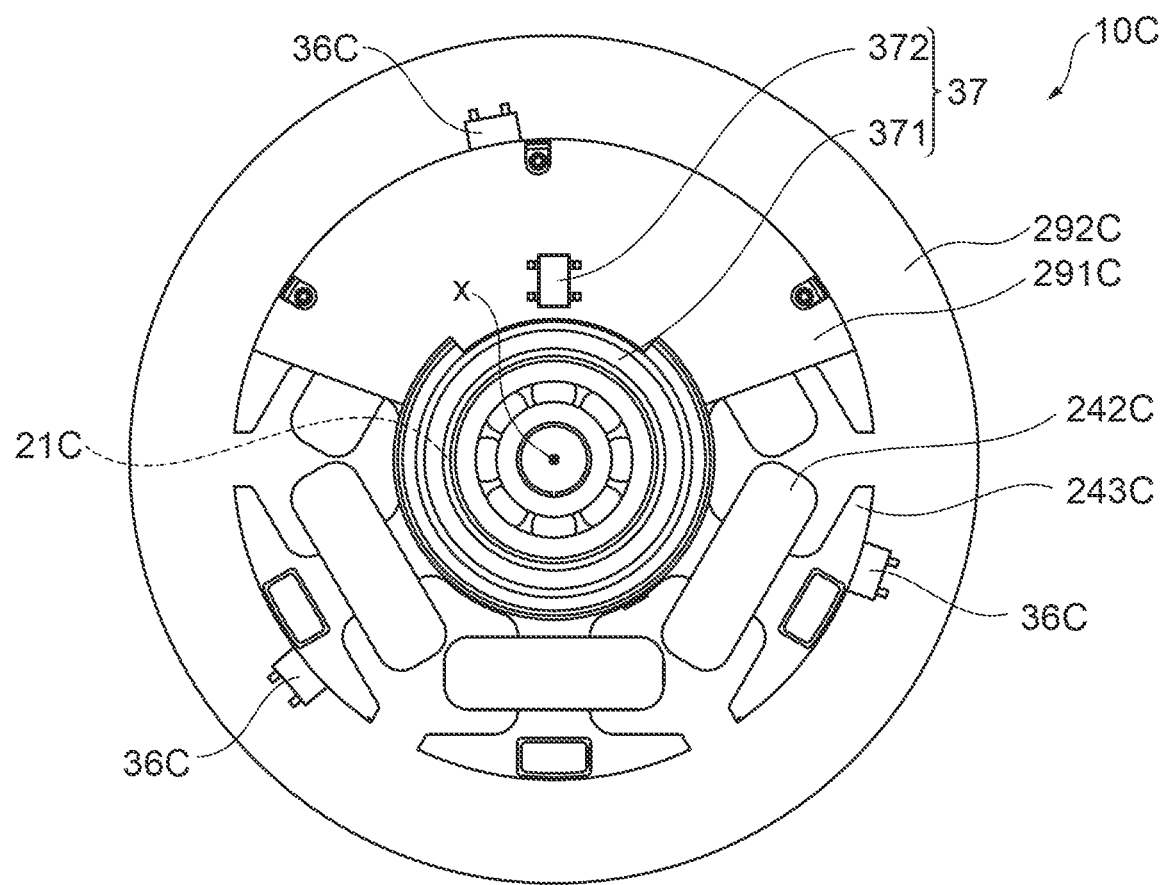
FIG. 11 A front view schematically showing configuration of the motor shown in FIG. 10.
Figure 12:
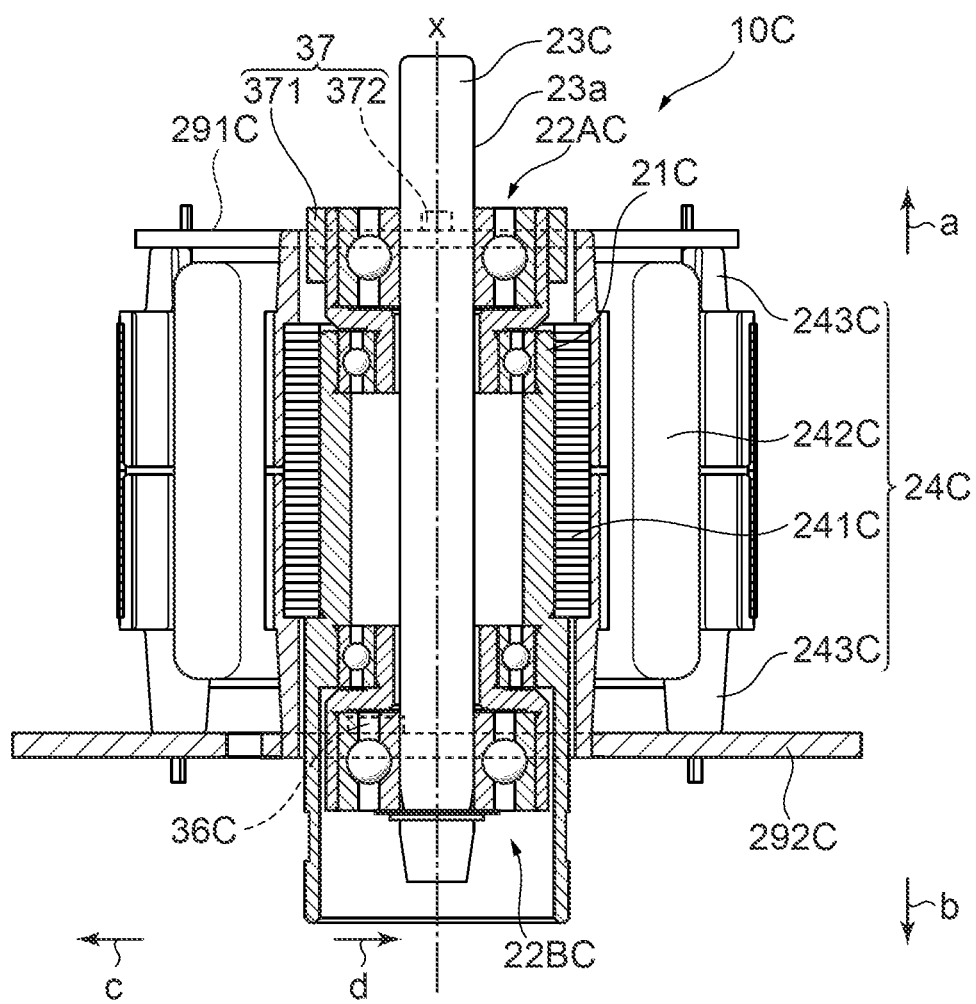
FIG. 12 A sectional view schematically showing configuration of the motor shown in FIG. 10.
Figure 13:
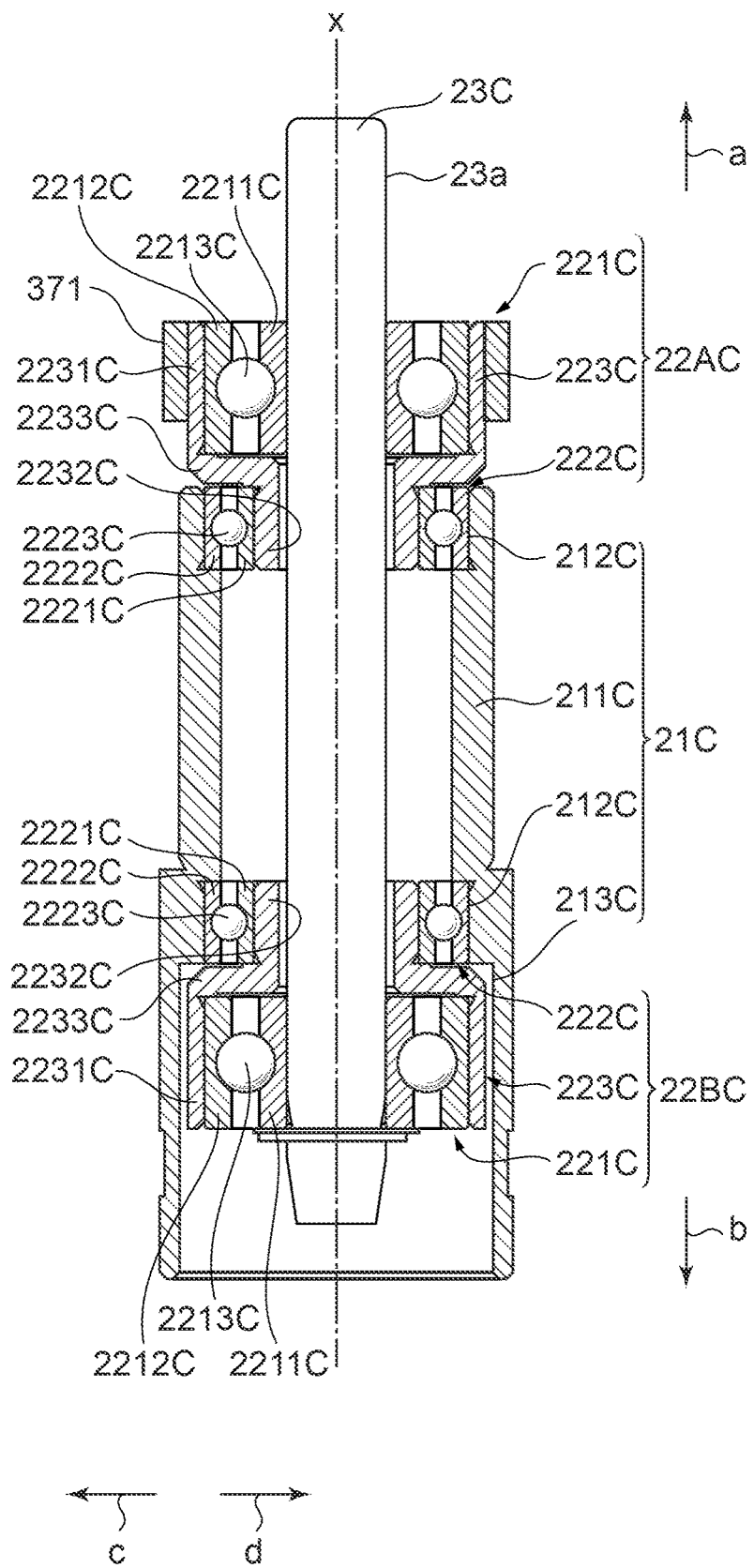
FIG. 13 A sectional view schematically showing configuration of a rotation shaft and bearing portions included in the fan device shown in FIG. 10.

FIG. 10 is a sectional view schematically showing configuration of the fan device 1C. FIG. 11 is a front view schematically showing configuration of the motor 10C. FIG. 12 is a sectional view schematically showing configuration of the motor 10C. FIG. 13 is a sectional view schematically showing configuration of a rotation shaft 23C and bearing portions 22AC and 22BC included in the fan device 1C.

As shown in FIGS. 10 to 13, the motor 10C according to the present embodiment is provided to the fan device 1C and includes a rotor having a rotation shaft 23C, a stator 24C arranged oppositely in the circumferential direction of the rotor, a pair of bearing portions 22AC and 22BC rotatably supporting the rotation shaft 23C and including a first bearing 221C being rotatable together with the rotation shaft 23C and a second bearing 222C being rotatable together with the first bearing 221C, and a bearing operation detecting unit 37 for detecting operation of the bearing portion 22AC and 22BC, the first bearing 221C includes a first inner race 2211C being rotatable together with the rotation shaft 23C, a first outer race 2212C provided on the outer periphery side c of the first inner race 2211C, and first rolling elements 2213C arranged between the first inner race 2211C and the first outer race 2212C, the second bearing 222C includes a second inner race 2221C being rotatable together with the first outer race 2212C, a second outer race 2222C provided on the outer periphery side of the second inner race 2221C, and second rolling elements 2223C arranged between the second inner race 2221C and the second outer race 2222C, and the bearing operation detecting unit 37 outputs bearing operation information according to rotational operation of the first outer race 2212C. Hereinafter, configuration and operation of the fan device 1C including the motor 10C will be specifically described.

[Configuration of Fan Device]

As shown in FIG. 10, the fan device 1C includes an impeller 30C including a plurality of blades 28C at a hub 25C and a casing 40C covering the outer periphery of the impeller 30C and defining the outer shape of the fan device 1C. In the impeller 30C, the hub 25C is arranged at a central portion around the axial line x inside the casing 40C. As shown in FIG. 10, in the fan device 1C, the motor 10C is arranged inside the hub 25C of the impeller 30C.

As shown in FIG. 10, the motor 10C is, for example, an outer rotor-type brushless DC (Direct Current) motor in which the rotation shaft 23C, a rotor yoke 26C connected to the rotation shaft 23C, and the impeller 30C form the rotor. The motor 10C includes the rotation shaft 23C, a bearing housing 21C, the pair of bearing portions 22AC and 22BC, the stator 24C, the rotor yoke 26C, a magnet 27C, a first base plate 291C, a second base plate 292C, a rotor operation detecting sensor (an example of a rotor operation detecting unit) 36C, and the bearing operation detecting unit 37.

As shown in FIGS. 10, 12, and 13, the rotation shaft 23C is a rod-shaped member arranged such that the longitudinal direction of the rotation shaft 23C is the axial line x direction. The bearing housing 21C is a hollow cylindrical body supported at a central portion of the casing 40C. The bearing housing 21C rotatably supports the rotation shaft 23C via the pair of bearing portions 22AC and 22BC. The bearing housing 21C includes a bearing supporting portion 212C supporting the bearing portion 22AC at one end of a cylindrical housing body 211C in the axial line x direction and a bearing supporting portion 213C supporting the bearing portion 22BC at another end of the housing body 211C in the axial line x direction. The bearing supporting portions 212C and 213C are each formed on the inner peripheral surface of the housing body 211C.

The pair of bearing portions 22AC and 22BC are specifically the bearing portion 22AC supported by the bearing supporting portion 212C provided at one end of the bearing housing 21C in the axial line x direction and the bearing portion 22BC supported by the bearing supporting portion 213C provided at another end of the bearing housing 21C in the axial line x direction, as described above. The pair of bearing portions 22AC and 22BC each include the first bearing 221C, the second bearing 222C, and a coupling portion 223C. As shown in FIG. 13, in each of the pair of bearing portions 22AC and 22BC, the second bearing 222C is provided at a position distanced from the first bearing 221C in the axial line x direction of the rotation shaft 23C.

As shown in FIG. 13, the first bearing 221C includes the first inner race 2211C, the first outer race 2212C, and the first rolling elements 2213C. The first inner race 2211C is an annular member having an inner peripheral surface that can be fitted to an outer circumferential surface 23*a* of the rotation shaft 23C. The first inner race 2211C is rotatable together with the rotation shaft 23C when fitted to the outer circumferential surface 23*a* of the rotation shaft 23C. The first outer race 2212C is provided on the outer periphery side c of the first inner race 2211C. The first outer race 2212C is an annular member being coaxial with the first inner race 2211C and having a larger diameter than that of the first inner race 2211C. The first rolling elements 2213C are a plurality of spherical members arranged between the first inner race 2211C and the first outer race 2212C. In the first bearing 221C, lubricant is infused between the first inner race 2211C, the first outer race 2212C, and the first rolling elements 2213C.

The second bearing 222C includes the second inner race 2221C, the second outer race 2222C, and the second rolling elements 2223C. The second inner race 2221C is an annular member having an inner peripheral surface that can be fitted to the coupling portion 223C. The second inner race 2221C is rotatable together with the first outer race 2212C via the coupling portion 223C when fitted to the coupling portion 223C. The second outer race 2222C is provided on the outer periphery side c of the second inner race 2221C. The second outer race 2222C is an annular member being coaxial with the second inner race 2221C and having a larger diameter than that of the second inner race 2221C. The second rolling elements 2223C are a plurality of spherical members arranged between the second inner race 2221C and the second outer race 2222C. In the second bearing 222C, lubricant is infused between the second inner race 2221C, the second outer race 2222C, and the second rolling elements 2223C.

The first bearing 221C and the second bearing 222C may have different kinetic viscosities from each other such as due to difference in the coefficients of mechanical friction of the components and the viscosities of the lubricants used in the first bearing 221C and the second bearing 222C. In the present embodiment, for example, the first bearing 221C has a kinetic viscosity lower than the kinetic viscosity of the second bearing 222C. Note that the kinetic viscosity of the first bearing 221C may be the same as the kinetic viscosity of the second bearing 222C or higher than the kinetic viscosity of the second bearing 222C.

The coupling portion 223C includes a first bearing accommodating part 2231C, a second bearing accommodating part 2232C, and a step portion 2233C. The coupling portion 223C rotatably couples the first outer race 2212C and the second inner race 2221C by the first bearing accommodating part 2231C and the second bearing accommodating part 2232C, which are cylindrical portions having different radial dimensions, and the step portion 2233C connecting the first bearing accommodating part 2231C and the second bearing accommodating part 2232C.

The first bearing accommodating part 2231C has an inner peripheral surface that can accommodate the first outer race 2212C of the first bearing 221C. Specifically, the first bearing accommodating part 2231C is formed to have a shape and dimension that is rotatable in cooperation with the first outer race 2212C.

The second bearing accommodating part 2232C has an inner peripheral surface having a shape and dimension to have a predetermined air gap from the outer circumferential surface 23a of the rotation shaft 23C. In addition, the second bearing accommodating part 2232C has an outer circumferential surface that can accommodate the second inner race 2221C of the second bearing 222C. The second bearing accommodating part 2232C is formed to have a shape and dimension that is rotatable in cooperation with the second inner race 2221C.

The stator 24C is fixed on the lower side b, for example, of the casing 40C. The stator 24C includes, for example, a stator core 241C formed by laminating a plurality of electromagnetic steel plates, a coil 242C wound on the stator core 241C, and an insulator 243C provided to the stator core 241C.

The rotor yoke 26C is provided on the inner periphery portion of the hub 25C of the impeller 30C, for example. The rotor yoke 26C is formed in a generally tubular shape, for example, for accommodating the magnet 27C. The rotor yoke 26C may be formed separately from or integrally with the hub 25C. The magnet 27C is attached to the inner peripheral surface of the rotor yoke 26C. The magnet 27C is provided to have a predetermined gap from the stator 24C provided on the inner periphery side d.

As shown in FIGS. 10 and 12, the first base plate 291C is provided on the outer periphery side c of at least one of the bearing portions 22AC and 22BC, for example, the bearing portion 22AC on the upper side a at one end of the stator 24C in the axial line x direction. As shown in FIGS. 11 and 12, the first base plate 291C is a plate-shaped base plate formed in a substantially arc shape at a portion on the outer periphery side c of the bearing portion 22AC. A bearing operation detecting sensor 372 of the bearing operation detecting unit 37 is mounted on the upper side a of the first base plate 291C.

As shown in FIGS. 10 and 12, the second base plate 292C is provided on the outer periphery side c of at least the other of the bearing portions 22AC and 22BC, for example, the bearing portion 22BC on the lower side b at another end of the stator 24C in the axial line x direction. That is, the second base plate 292C is arranged to sandwich the stator 24C with the first base plate 291C in a direction parallel to the axial line x of the rotation shaft 23C of the rotor. As shown in FIGS. 11 and 12, the second base plate 292C is a base plate formed such that its outer shape is a substantially disc shape on the outer periphery side c of the bearing portion 22BC. A rotor operation detecting sensor 36C as a rotor operation detecting unit is mounted on the upper side a of the second base plate 292C.

The rotor operation detecting sensor 36C is mounted on the upper side a of the second base plate 292C as described above. The rotor operation detecting sensor 36C is arranged in the magnetic field range of the magnet 27C provided on the inner peripheral surface of the hub 25C of the impeller 30C forming the rotor, for example, on the inner periphery side d of the magnet 27C. As the magnet 27C attached to the rotor rotates, the rotor operation detecting sensor 36C outputs a first Hall signal (an example of rotor operation information) as rotor operation information, which is a positional signal according to rotational operation of the magnet 27C. The rotor operation information is, specifically, for example, information according to the rotational frequency of the rotor such as information on the rotational frequency or rotational speed of the rotor, and is, specifically, the first Hall signal mentioned above or information on the rotational frequency of the rotor (a rotor rotational frequency signal) calculated from the first Hall signal. Note that the number of rotor operation detecting sensors 36C is not limited to that in the present embodiment.

The bearing operation detecting unit 37 is formed by a bearing operation detecting magnet 371 and the bearing operation detecting sensor 372. The bearing operation detecting magnet 371 is provided on the outer periphery side c of the first outer race 2212C, for example, on the outer periphery side c of the first bearing accommodating part 2231C of the coupling portion 223C, which covers the outer periphery side c of the first outer race 2212C and is rotatable together with the first outer race 2212C. The bearing operation detecting magnet 371 is rotatable together with the first outer race 2212C by being arranged in this manner. The bearing operation detecting sensor 372 is mounted in the magnetic field range of the bearing operation detecting magnet 371, specifically, on the upper side a of the first base plate 291C located on the outer periphery side c of the bearing operation detecting magnet 371. As the bearing operation detecting magnet 371 attached to the coupling portion 223C rotating together with the first outer race 2212C rotates, the bearing operation detecting sensor 372 outputs a second Hall signal as bearing operation information, which is a Hall signal according to the rotational operation of the bearing operation detecting magnet 371. The bearing operation information is, specifically, for example, information on the rotational frequency or rotational speed of the bearing, and is, specifically, the second Hall signal or information according to the rotational frequency of the first bearing 221C (a bearing rotational frequency signal) calculated from the second Hall signal. Note that the number of bearing operation detecting units 37 is not limited to that in the present embodiment.

<Motor State Determination Device of Third Embodiment>

Next, configuration of a driving control device 3C as a motor state determination device according to the third embodiment will be described. Note that components of the driving control device 3C of the motor 10C according to the present embodiment similar to those of the driving control device 3 previously described are given by the same reference characters, and descriptions of these components will be omitted.

In the present embodiment, the driving control device 3C of the motor 10C functions as a state determination device that determines the state of the bearing portions 22AC and 22BC of the motor 10C. The driving control device 3C includes a bearing abnormality determining unit 35C as a state determining unit that determines the state of rotational movement of the first bearing 221C by using the bearing operation information output by the bearing operation detecting sensor 372 of the bearing operation detecting unit 37 of the motor 10C and the rotor operation information output by the rotor operation detecting sensor 36C. As will be described later, the bearing abnormality determining unit 35C determines whether the first bearing 221C is degraded based on the bearing operation information. In addition, the bearing abnormality determining unit 35C determines whether the first bearing 221C is in failure based on the bearing operation information and the rotor operation information. Hereinafter, the driving control device 3C of the motor 10C functioning as a motor state determination device will be described.

Figure 14:
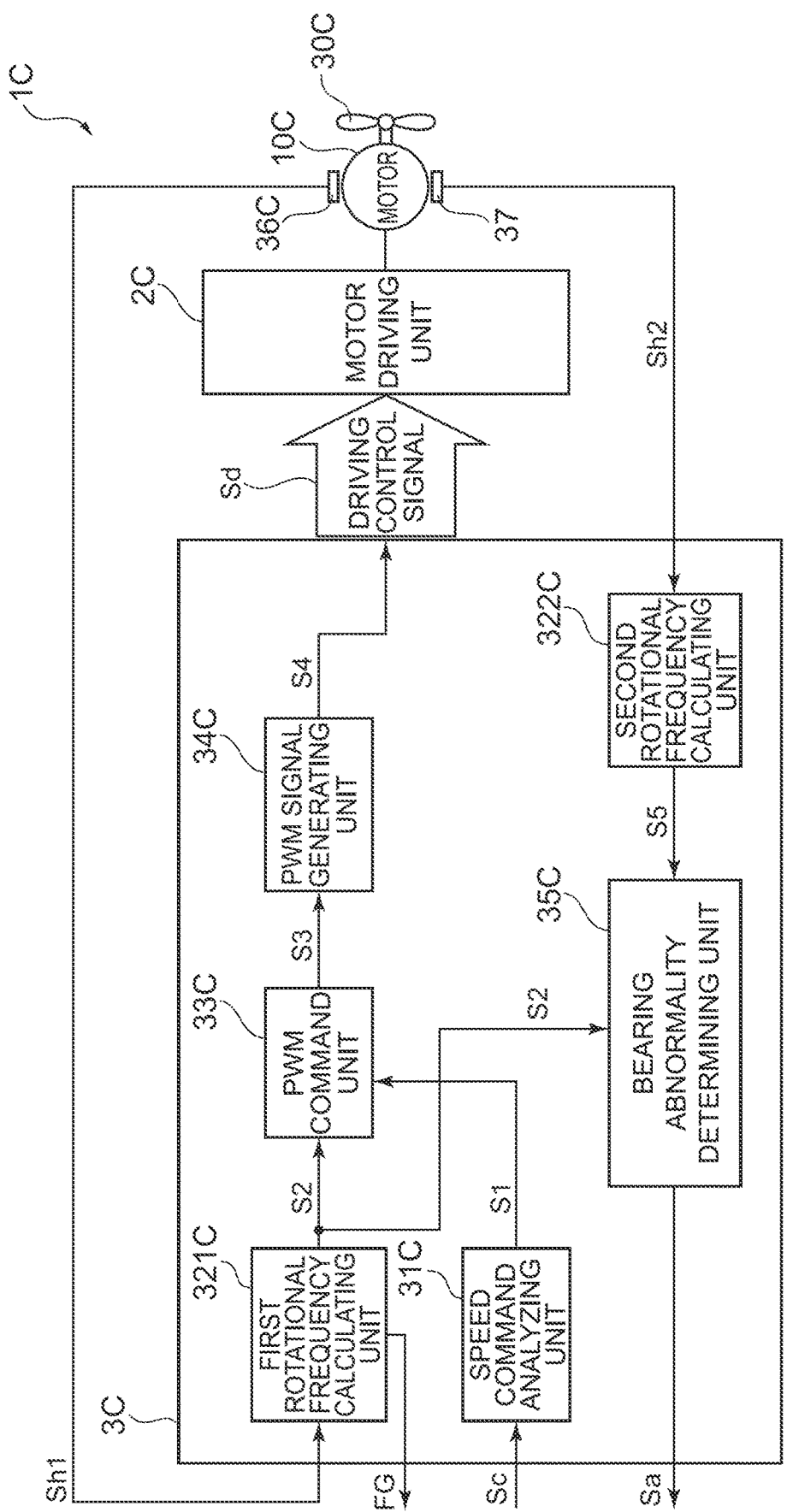
FIG. 14 A functional block diagram of a driving control device of the motor according to the third embodiment of the present invention.

FIG. 14 is a functional block diagram of the driving control device 3C of the motor 10C according to the third embodiment of the present invention. As shown in FIG. 14, the driving control device (an example of a state determination device) 3C of the motor 10C includes a speed command analyzing unit 31C, a first rotational frequency calculating unit 321C, a second rotational frequency calculating unit 322C, a PWM (Pulse Width Modulation) command unit 33C, a PWM signal generating unit 34C, and the bearing abnormality determining unit (an example of a state determining unit) 35C. The driving control device 3C is realized by, for example, an information processing device capable of executing various computer programs including a program for realizing the following functional blocks of the driving control device 3C according to the present invention, such as an MCU (Micro Controller Unit), and a storage device such as a ROM (Read-Only Memory) for storing the computer programs, data for executing the programs, and the like. The ROM also stores a threshold value used in processing of the bearing abnormality determining unit 35C, which will be described later, for determining that the first bearing 221C is degraded, and information on the ratio of a rotor rotational frequency signal (an example of rotor operation information) S2 to a bearing rotational frequency signal (an example of bearing operation information) S5 for determining that the first bearing 221C is in failure.

The speed command analyzing unit 31C receives a speed command signal Sc for the motor 10C from external equipment (not shown) such as a control unit of a server, and generates a target rotational frequency signal S1 for providing an indication to the PWM command unit 33C.

The first rotational frequency calculating unit 321C acquires a first Hall signal Sh1 (information on the rotational frequency of the rotor; an example of rotor operation information) acquired by the rotor operation detecting sensor 36C attached to the motor 10C and provided to detect the rotational frequency of the magnet 27C of the rotor, calculates the rotational frequency of the rotor based on the first Hall signal Sh1, and outputs a rotor rotational frequency signal S2. The first rotational frequency calculating unit 321C outputs the rotor rotational frequency signal S2 to the PWM command unit 33C and the bearing abnormality determining unit 35C. In addition, the first rotational frequency calculating unit 321C outputs the calculated rotational frequency of the rotor to the external equipment as an FG (Frequency Generator) signal FG.

The second rotational frequency calculating unit 322C acquires a second Hall signal Sh2 (information on the rotational frequency of the first outer race 2212C of the first bearing 221C) acquired from the bearing operation detecting unit 37 provided to detect the rotational frequency of the first outer race 2212C of the first bearing 221C of the bearing portions 22AC and 22BC in the motor 10C, calculates the rotational frequency of the first outer race 2212C based on the second Hall signal Sh2, and outputs a bearing rotational frequency signal S5. The second rotational frequency calculating unit 322C outputs the bearing rotational frequency signal S5 to the PWM command unit 33C and the bearing abnormality determining unit 35C.

The PWM command unit 33C outputs, to the PWM signal generating unit 34C, a PWM setting indication signal S3 generated based on the target rotational frequency signal S1 output from the speed command analyzing unit 31C and the rotor rotational frequency signal S2 output from the first rotational frequency calculating unit 321C. The PWM setting indication signal S3 is a signal indicating setting of a PWM signal to be generated by the PWM signal generating unit 34C, that is, the duty cycle of a PWM signal required to drive the motor 10C at a desired rotational frequency.

The PWM signal generating unit 34C generates and outputs a driving control signal Sd for controlling a motor driving unit 2C, that is, a PWM signal S4 having a desired duty cycle based on the PWM setting indication signal S3 output by the PWM command unit 33C.

The motor driving unit 2C drives the motor 10C based on the driving control signal Sd.

The bearing abnormality determining unit 35C functions as a state determining unit that determines the state of rotational movement of the bearing portions 22AC and 22BC based on the rotor operation information calculated by the first rotational frequency calculating unit 321C and the bearing operation information calculated by the second rotational frequency calculating unit 322C.

When the bearing operation information, that is, the second Hall signal Sh2 that is a pulse signal indicating that the first outer race 2212C is rotating or the bearing rotational frequency signal S5 is detected, the bearing abnormality determining unit 35C determines that the second bearing 222C is rotating together with the rotation shaft 23C in the bearing portions 22AC and 22BC.

The bearing abnormality determining unit 35C detects whether abnormality such as degradation or failure of the first bearing 221C of the bearing portions 22AC and 22BC is occurring by comparing the bearing operation information (for example, the bearing rotational frequency signal S5) and the rotor operation information (for example, the rotor rotational frequency signal S2). Specifically, the bearing abnormality determining unit 35C compares the bearing operation information and the rotor operation information to determine that degradation (functional deterioration) of the first bearing 221C is occurring if the first outer race 2212C is rotating and the ratio of the rotational frequency of the rotor to the rotational frequency of the first outer race 2212C is less than a predetermined numerical value. In addition, the bearing abnormality determining unit 35C compares the bearing operation information and the rotor operation information to determine that the abnormal state, that is, degradation of the first bearing 221C progresses and the rotation shaft 23C and the first bearing 221C are locked up, that is, are in failure if the ratio of the rotational frequency of the rotor to the rotational frequency of the first outer race 2212C is greater than or equal to the predetermined numerical value. The bearing abnormality determining unit 35C outputs information on the detected state of the bearing portions 22AC and 22BC to the external equipment as an abnormality reporting signal Sa. Note that the bearing abnormality determining unit 35C is only required to determine the degradation or failure of the first bearing 221C by using the rotor operation information and the bearing operation information. Thus, the bearing abnormality determining unit 35C may use, for example, the first Hall signal Sh1 or the FG signal FG for the processing instead of the rotor rotational frequency signal S2. In addition, the bearing abnormality determining unit 35C may use, for example, the second Hall signal Sh2 for the processing instead of the bearing rotational frequency signal S5.

[Operation of Fan Device and Driving Control Device]

Next, operation of the fan device 1C and the driving control device 3C of the motor 10C of the fan device 1C having the above-described configuration will be described.

Figure 15:
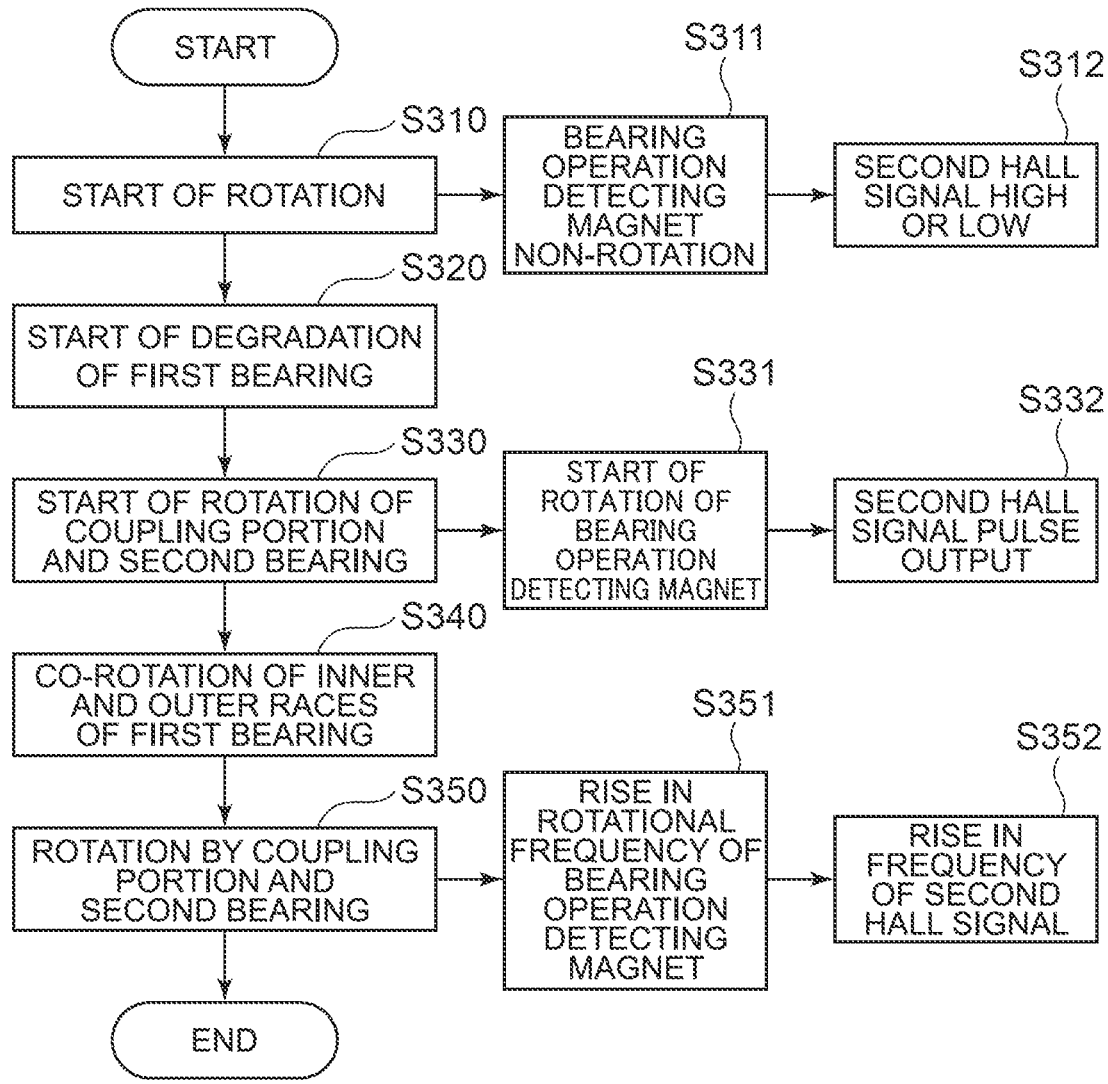
FIG. 15 A flow chart for showing transition of operations of the bearing portions and operations of a bearing operation detecting unit in the motor included in the fan device shown in FIG. 10.
Figure 16:
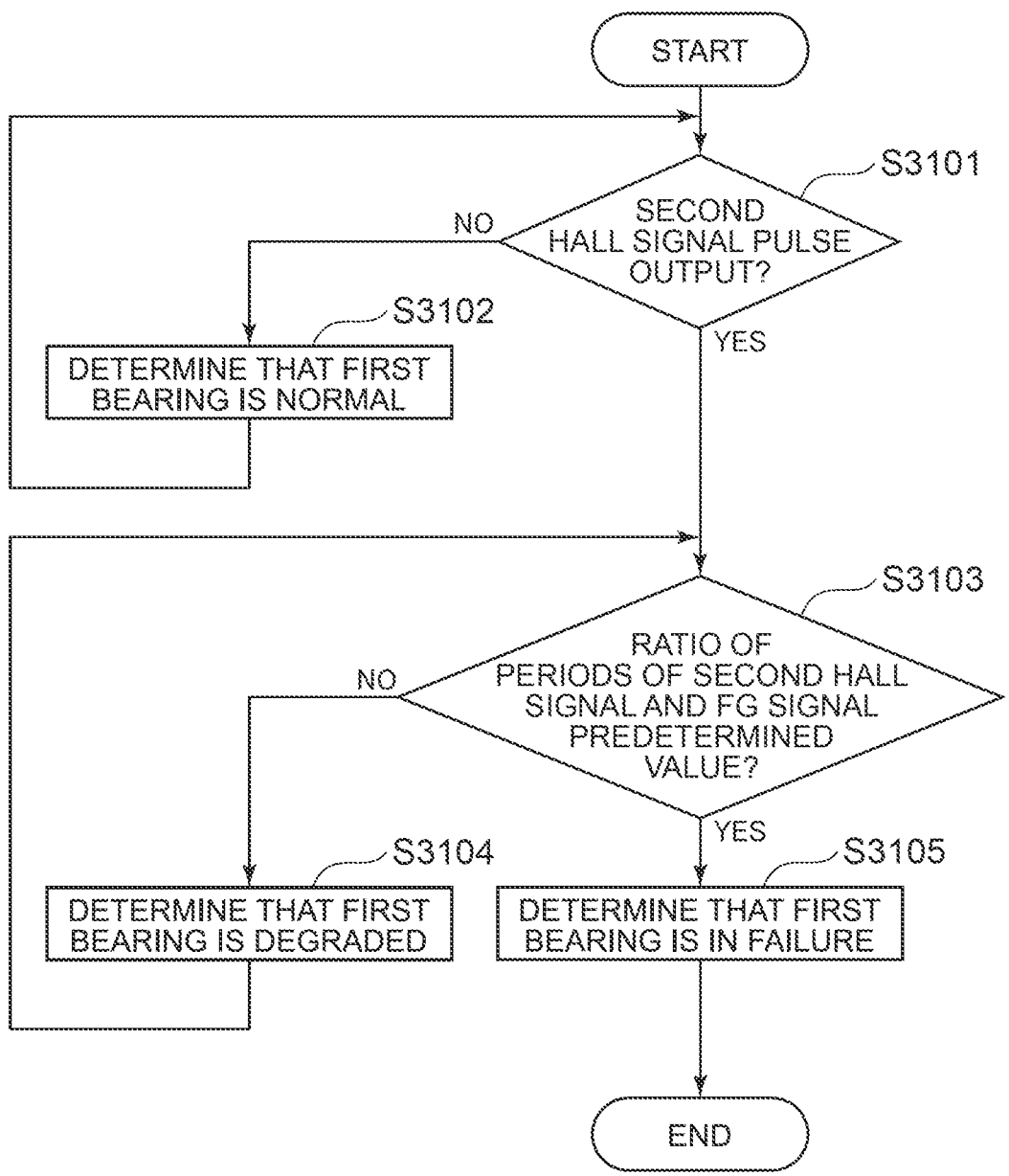
FIG. 16 A flow chart for showing an example of a state detection process for the bearing portions by the driving control device of the motor shown in FIG. 14.
Figure 17:
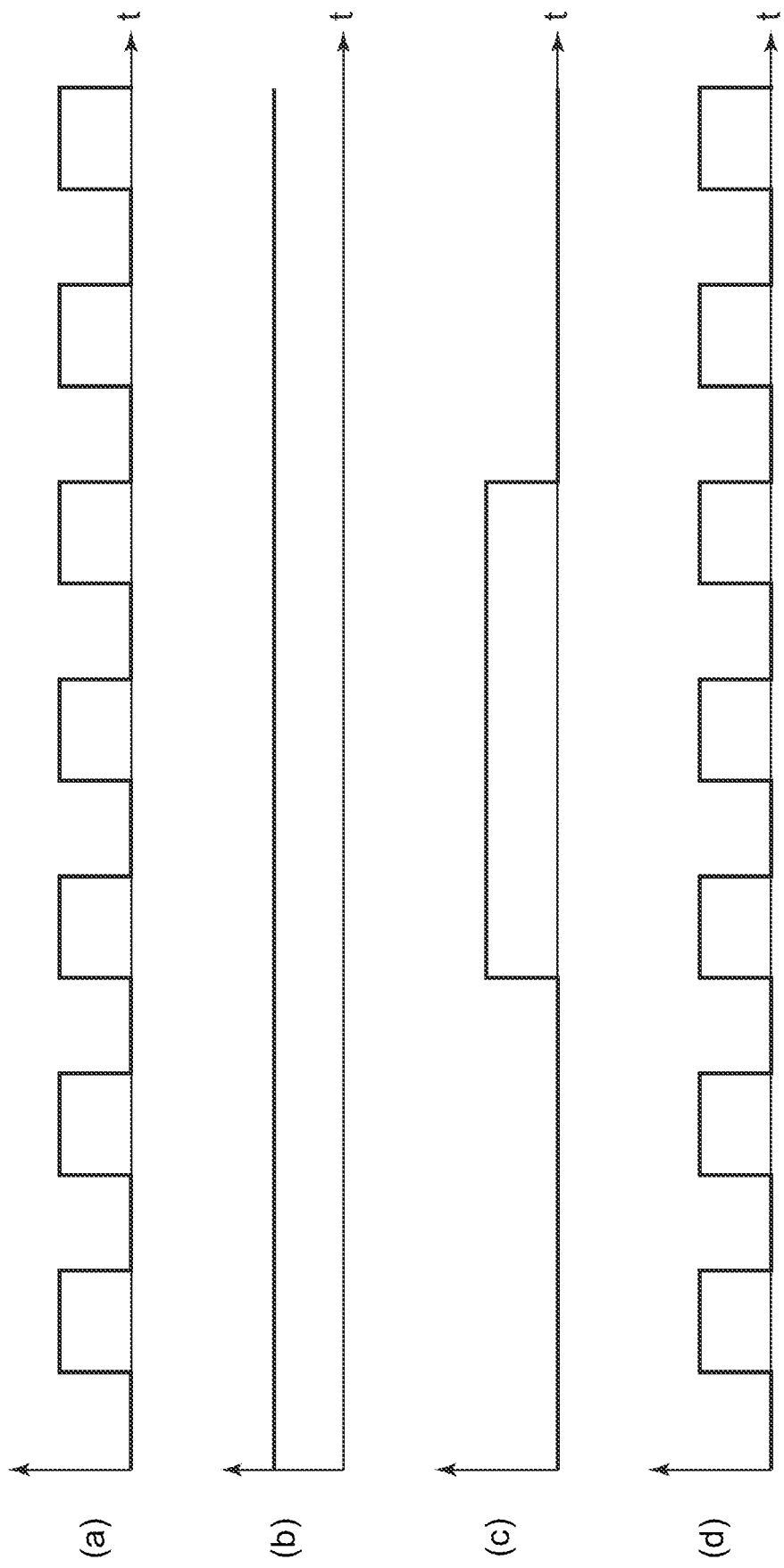
FIG. 17 A schematic diagram of (a) an FG signal as rotor operation information based on a first Hall signal, (b) a bearing rotational frequency signal as bearing operation information based on a second Hall signal in the state where a first bearing is in normal operation, (c) a bearing rotational frequency signal as bearing operation information based on a second Hall signal in the state where the first bearing is degraded, (d) a bearing rotational frequency signal as bearing operation information based on a second Hall signal in the state where the first bearing is locked up (fails), in the motor included in the fan device shown in FIG. 10.

FIG. 15 is a flow chart for showing transition of operations of the bearing portions 22AC and 22BC and operations of the bearing operation detecting unit 37 in the motor 10C included in the fan device 1C. FIG. 16 is a flow chart for showing an example of a state detection process for the bearing portions 22AC and 22BC by the driving control device 3C of the motor 10C. FIG. 17 is a schematic diagram of (a) the FG signal FG as the rotor operation information based on the first Hall signal Sh1, (b) the bearing rotational frequency signal S5 as the bearing operation information based on the second Hall signal Sh2 in the state where the first bearing 221C is in normal operation, (c) the bearing rotational frequency signal S5 as the bearing operation information based on the second Hall signal Sh2 in the state where the first bearing 221C is degraded, (d) the bearing rotational frequency signal S5 as the bearing operation information based on the second Hall signal Sh2 in the state where the first bearing 221C is locked up (fails), in the motor 10C included in the fan device 1C.

As shown in FIG. 15, in the motor 10C, rotation of the rotation shaft 23C starts when driving current flows (step S310). As shown in FIGS. 10, 12, and 13, the rotation shaft 23C of the motor 10C is rotatably supported by the pair of bearing portions 22AC and 22BC fitted to the bearing housing 21C. In addition, one end of the rotation shaft 23C on the upper side a is coupled to the hub 25C of the impeller 30C. Thus, when the motor 10C is driven, the rotation shaft 23C rotates about the axial line x, and the impeller 30C also rotates about the axial line x in association.

In the motor 10C, the pair of bearing portions 22AC and 22BC each include the first bearing 221C being rotatable together with the rotation shaft 23C and the second bearing 222C being rotatable together with the first bearing 221C. Here, in the pair of bearing portions 22AC and 22BC, the first inner race 2211C of the first bearing 221C and the outer circumferential surface 23a of the rotation shaft 23C contact each other, and thus the first inner race 2211C and the rotation shaft 23C rotate together. The first outer race 2212C of the first bearing 221C contacts the first bearing accommodating part 2231C of the coupling portion 223C. The second inner race 2221C of the second bearing 222C contacts the second bearing accommodating part 2232C of the coupling portion 223C. Thus, in the bearing portions 22AC and 22BC, when the first bearing 221C is degraded or fails and the first inner race 2211C and the first outer race 2212C rotate integrally, the second bearing 222C rotates together with the rotation shaft 23C.

In the bearing portions 22AC and 22BC of the motor 10C configured as described above, in a regular state (during a predetermined time after starting operation), the first bearing 221C having a lower kinetic viscosity has a normal operational function, and thus the first inner race 2211C is supported by the first rolling elements 2213C and the first outer race 2212C and rotates together with the rotation shaft 23C. In this case, the rotor operation detecting sensor 36C outputs pulses according to the rotational operation as in (a) in FIG. 17 when the rotor rotates at a predetermined rotational frequency, for example.

That is, in the motor 10C, in the regular state, the first inner race 2211C rotates together with the rotation shaft 23C, and thus the first outer race 2212C and the coupling portion 223C, which is rotatable together with the first outer race 2212C, do not rotate. Thus, the bearing operation detecting magnet 371, which is attached to the outer periphery side c of the coupling portion 223C, also does not rotate (step S311). Since the bearing operation detecting magnet 371 does not rotate, the second Hall signal Sh2 output from the bearing operation detecting sensor 372 is output as a constant signal of High or Low, not as a pulse signal, as shown in (b) in FIG. 17 (step S312).

Thereafter, in the bearing portions 22AC and 22BC in the motor 10C, when the operational function of the first bearing 221C is degraded or starts to fail, the coefficient of friction of the first bearing 221C rises (step S320). In the bearing portions 22AC and 22BC, when the rotational torque of the first bearing 221C exceeds a starting torque of the second bearing 222C, the coupling portion 223C and the second bearing 222C start to rotate (step S330). Specifically, in the bearing portions 22AC and 22BC, the first inner race 2211C, the first outer race 2212C, and the first rolling elements 2213C of the first bearing 221C integrally rotate together with the rotation shaft 23C. In the motor 10C, in such a state where abnormality such as degradation or failure of the operational function of the first bearing 221C occurs, in the first bearing 221C, the rotational torque of the first bearing 221C rises in association with the degradation or failure conditions, and the first outer race 2212C rotates together with the first inner race 2211C. Thus, the coupling portion 223C, which is rotatable together with the first outer race 2212C and the first outer race 2212C, also rotates together with the first outer race 2212C. In addition, the bearing operation detecting magnet 371, which is attached to the outer periphery side c of the coupling portion 223C, also starts to rotate (step S331). In this case, the first bearing 221C continues the rotational operation with a different ratio than that of the rotor since the first inner race 2211C and the first rolling elements 2213C are not completely locked up. That is, in the first bearing 221C, the rotation of the first outer race 2212C is at a lower rotational frequency than the rotation shaft 23C (rotor) and is not synchronized with the rotational frequency of the rotor, and thus, the second Hall signal Sh2 output from the bearing operation detecting sensor 372 is output at a different period than the FG signal FG shown in (a) in FIG. 17, as shown in (c) in FIG. 17 (step S332).

In the coupling portion 223C, the inner peripheral surface of the first bearing accommodating part 2231C is connected to be rotatable together with the first outer race 2212C of the first bearing 221C as described above. In such a state where the first outer race 2212C rotates (co-rotates) together with the first inner race 2211C in the first bearing 221C (step S340), the rotational torque of the first bearing 221C exceeds the starting torque of the second bearing 222C. At this time, in the bearing portions 22AC and 22BC, the second bearing 222C starts to rotate together with the rotation shaft 23C via the coupling portion 223C. That is, the second inner race 2221C of the second bearing 222C is attached to the outer circumferential surface of the second bearing accommodating part 2232C of the coupling portion 223C as described above, and can rotate in association with the rotation of the coupling portion 223C. Thus, in the motor 10C, the coupling portion 223C and the second bearing 222C rotate together with the rotation shaft 23C (step S350).

In the motor 10C, when the state where the operational function of the first bearing 221C is degraded or fail progresses, in the first bearing 221C, the rotational frequencies of the first inner race 2211C, the first rolling elements 2213C, and the first outer race 2212C gradually rise, and the first inner race 2211C, the first rolling elements 2213C, and the first outer race 2212C finally rotate integrally with the rotation shaft 23C at the same rotational frequency as that of the rotation shaft 23C. Thus, the coupling portion 223C, which is rotatable together with the first outer race 2212C and the first outer race 2212C, also rotates together with the first outer race 2212C at the same rotational frequency as that of the rotation shaft 23C. In addition, the rotational frequency of the bearing operation detecting magnet 371, which is attached to the outer periphery side c of the coupling portion 223C, also rises in a manner similar to the rotational frequency of the first outer race 2212C, and it rotates at the same rotational frequency as that of the rotation shaft 23C (step S351). That is, in the first bearing 221C, the rotation of the first outer race 2212C is synchronized with the rotation shaft 23C (rotor), and thus, the second Hall signal Sh2 output from the bearing operation detecting sensor 372 rises in frequency and is output at a frequency approximately similar to the FG signal FG shown in (a) in FIG. 17, as shown in (d) in FIG. 17 (step S352).

FIG. 16 is a flow chart for showing an example of a state detection process for the bearing portions 22AC and 22BC by the driving control device 3C of the motor 10C. In the example of the state detection process for the bearing portions 22AC and 22BC by the driving control device 3C shown in FIG. 16, the bearing abnormality determining unit 35C determines that degradation (functional deterioration) of the first bearing 221C is occurring if the first outer race 2212C is rotating and the ratio of the rotational frequency of the rotor to the rotational frequency of the first outer race 2212C is less than a predetermined numerical value, as described above. In addition, the bearing abnormality determining unit 35C determines that the degradation of the first bearing 221C progresses and the rotation shaft 23C and the first bearing 221C are locked up, that is, are in failure if the ratio of the rotational frequency of the rotor to the rotational frequency of the first outer race 2212C is greater than or equal to the predetermined numerical value. In the example of the state detection process for the bearing portions 22AC and 22BC shown in FIG. 16, the second Hall signal Sh2 output from the bearing operation detecting unit 37 is used as the bearing operation information. In addition, in the example of the state detection process for the bearing portions 22AC and 22BC shown in FIG. 16, the FG signal FG is used as the rotor operation information.

The bearing abnormality determining unit 35C determines whether the second Hall signal Sh2 has a pulse output waveform shown in (c) in FIG. 17 or (d) in FIG. 17 via the second rotational frequency calculating unit 322C (step S3101).

If the second Hall signal Sh2 does not have the pulse output waveform, that is, it is the normal-state signal shown in (b) in FIG. 17 (step S3101: NO), the bearing abnormality determining unit 35C determines that the first bearing 221C is normal (in the state where the first inner race 2211C rotates with the rotation shaft 23C and the first outer race 2212C does not rotate) in the bearing portions 22AC and 22BC of the motor 10C based on the second Hall signal Sh2 (step S3102).

If the second Hall signal Sh2 has the pulse output waveform, that is, the second Hall signal Sh2 is a signal output when the first bearing 221C is degraded or fails as shown in (c) in FIG. 17 or (d) in FIG. 17 (step S3101: YES), the bearing abnormality determining unit 35C compares the second Hall signal Sh2 and the FG signal FG and determines whether the ratio of the rotational frequency of the first outer race to rotational frequency of the rotor is a predetermined value (step S3103). When the first bearing 221C is degraded, the rotational torque of the first bearing 221C gradually increases, and thus the period of the pulse signal of the second Hall signal Sh2 becomes closer to the period of the pulse signal as the FG signal FG. That is, in other words, when the first bearing 221C is degraded, the rotational frequency of the first bearing 221C becomes closer to a predetermined rotational frequency that is the actual rotational frequency of the motor 10C. In this step, either whether the first bearing 221C is degraded or whether the first bearing 221C is in failure is determined based on the ratio in period between the second Hall signal Sh2 and the FG signal FG.

If the period of the second Hall signal Sh2 does not have a pulse output waveform with a predetermined ratio relative to the period of the FG signal FG as shown in (c) in FIG. 17 (step S3103: NO), the bearing abnormality determining unit 35C determines that the first outer race 2212C is rotating but the rotation of the first outer race 2212C is not synchronized with the rotation of the rotation shaft 23C (rotor), and thus the first bearing 221C is in a degraded state of rotating at less than a predetermined rotational frequency (step S3104).

On the other hand, if the period of the second Hall signal Sh2 has a pulse output waveform with a predetermined ratio, for example, a ratio of 50% relative to the period of the FG signal FG as shown in (d) in FIG. 17 (step S3103: YES), the bearing abnormality determining unit 35C determines that the rotation of the first outer race 2212C is synchronized with the rotation of the rotation shaft 23C (rotor) in the first bearing 221C (the first bearing 221C is rotating at the same predetermined rotational frequency as that of the rotation shaft 23C), and determines that the first inner race 2211C, the first outer race 2212C, and the first rolling elements 2213C of the first bearing 221C are in a failure state of being locked up (step S3105).

With the motor 10C configured as described above, it is possible to output the second Hall signal Sh2 from the bearing operation detecting unit 37, which detects the operational conditions of the first outer race 2212C of the first bearing 221C, in the motor 10C in which the rotation shaft 23C is supported by the pair of bearing portions 22AC and 22BC including the first bearing 221C and the second bearing 222C. In addition, with the driving control device 3C of the motor 10C, the operational state of the bearing portions 22AC and 22BC is determined from the bearing rotational frequency signal S5 based on the second Hall signal Sh2 output from the motor 10C. Thus, it is possible to easily determine which of the first bearing 221C or the second bearing 222C is operating in the bearing portions 22AC and 22BC, that is, the operational state of the bearing portions 22AC and 22BC. That is, with the driving control device 3C of the motor 10C configured as described above, it is possible to easily determine the operational state of the bearing portions 22AC and 22BC of the motor 10C and thus predict the replacement timing and life of the bearing portions 22AC and 22BC.

<Fourth Embodiment of Motor>

Next, a fan device 1D including a motor 10D of a fourth embodiment according to the present invention will be described. Note that components of the motor 10D according to the present embodiment similar to those of the motor 10, 10C previously described are given by the same reference characters, and descriptions of these components will be omitted.

Figure 18:
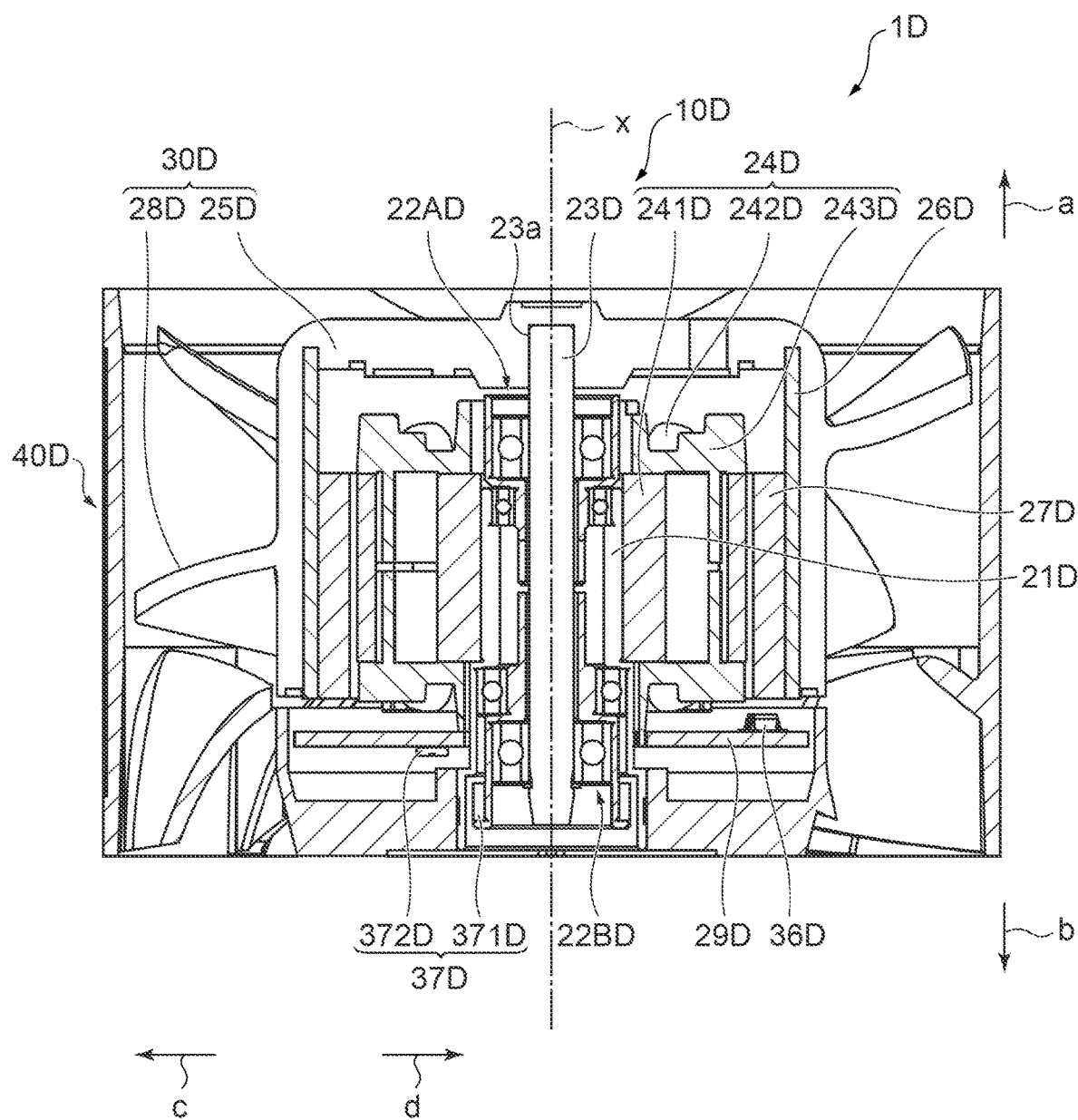
FIG. 18 A sectional view schematically showing configuration of a fan device including a motor of a fourth embodiment according to the present invention.
Figure 19:
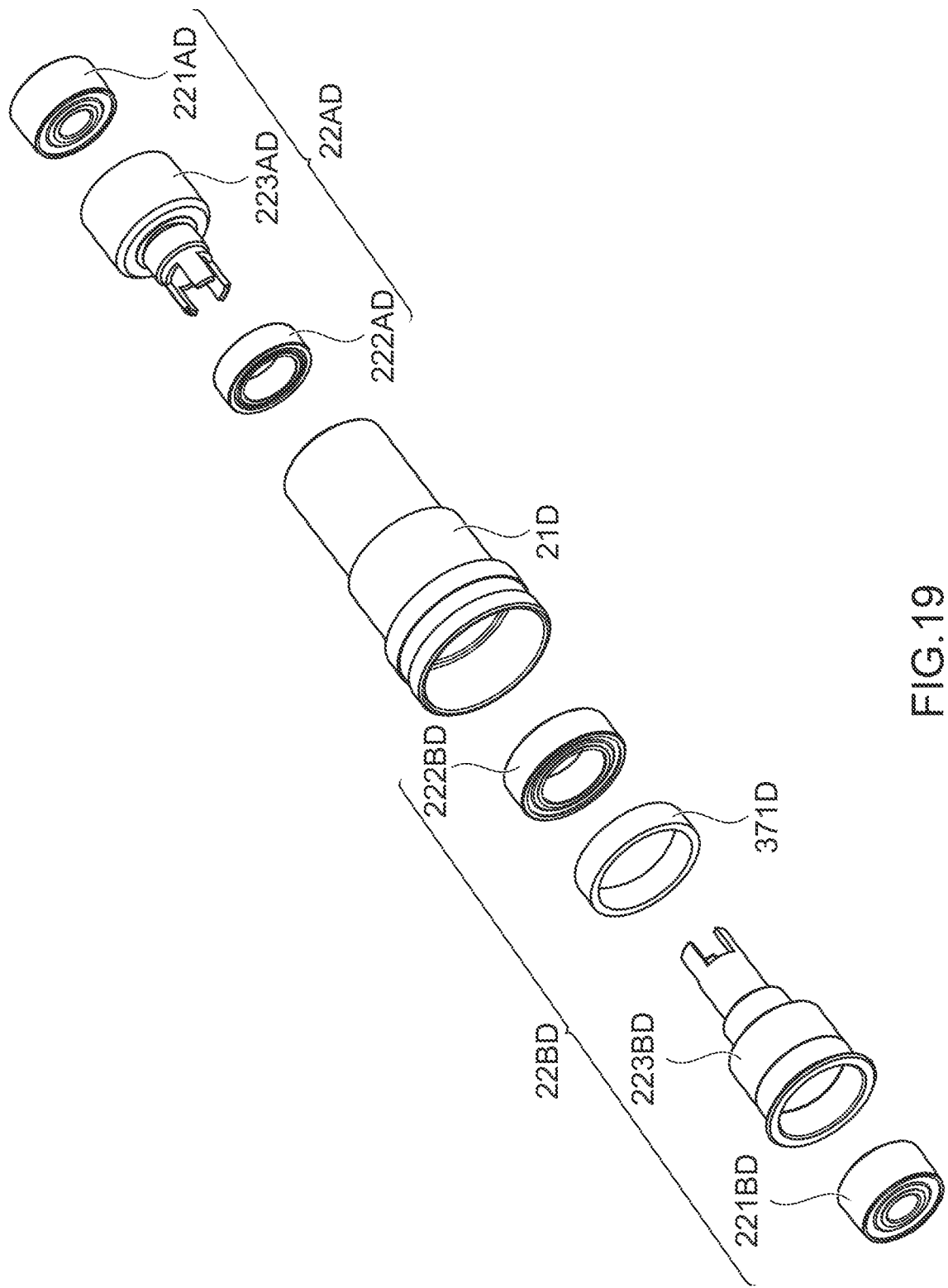
FIG. 19 An exploded perspective view schematically showing configuration of bearing portions included in the fan device shown in FIG. 18.
Figure 20:
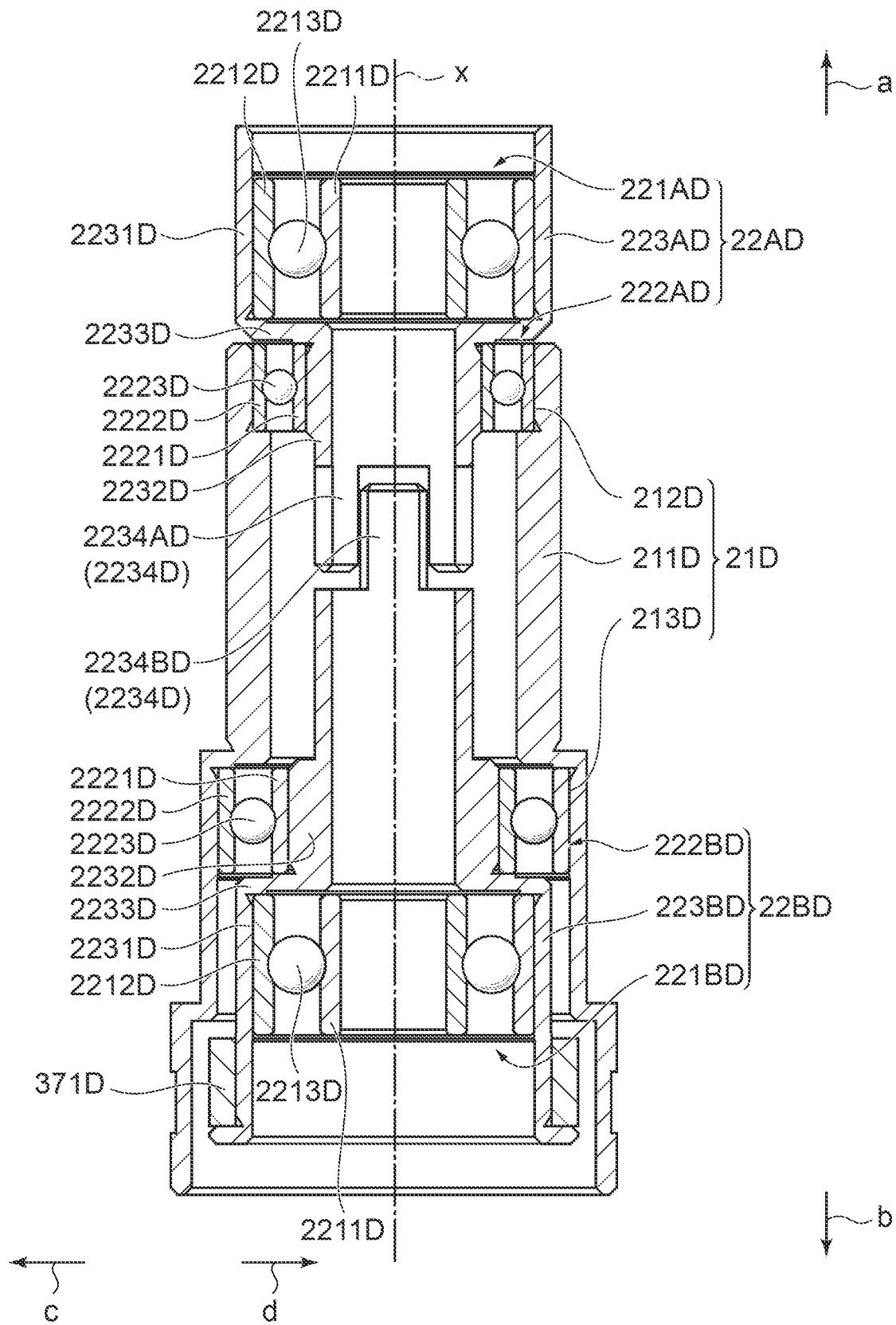
FIG. 20 A sectional view schematically showing configuration of the bearing portions included in the fan device shown in FIG. 18.

As shown in FIGS. 18 to 20, the motor 10D according to the present embodiment includes a rotor having a rotation shaft 23D, a stator 24D arranged oppositely in the circumferential direction of the rotor, and a pair of bearing portions 22AD and 22BD rotatably supporting the rotation shaft 23D. The pair of bearing portions 22AD and 22BD each include a first bearing 221AD, 221BD being rotatable together with the rotation shaft 23D, a second bearing 222AD, 222BD being rotatable together with the first bearing 221AD, 221BD, and a coupling portion 223AD, 223BD coupling the first bearing 221AD, 221BD and the second bearing 222AD, 222BD to rotate in conjunction, and the coupling portions 223AD and 223BD respectively included in the pair of bearing portions 22AD and 22BD are coupled to rotate in conjunction. Hereinafter, configuration and operation of the fan device 1D including the motor 10D will be specifically described.

[Configuration of Fan Device]

As shown in FIG. 18, the fan device 1D includes an impeller 30D including a plurality of blades 28D at a hub 25D and a casing 40D covering the outer periphery of the impeller 30D and defining the outer shape of the fan device 1D. In the impeller 30D, the hub 25D is arranged at a central portion around the axial line x inside the casing 40D. In the fan device 1D, the motor 10D is arranged inside the hub 25D of the impeller 30D.

As shown in FIG. 18, the motor 10D is, for example, an outer rotor-type brushless DC (Direct Current) motor in which the rotation shaft 23D, a rotor yoke 26D connected to the rotation shaft 23D, and the impeller 30D form the rotor. The motor 10D includes the rotation shaft 23D, a bearing housing 21D, the pair of bearing portions 22AD and 22BD, the stator 24D, the rotor yoke 26D, a magnet 27D, a base plate 29D, a rotor operation detecting sensor (an example of a rotor operation detecting unit) 36D, and a bearing operation detecting unit 37D.

As shown in FIG. 18, the rotation shaft 23D is a rod-shaped member arranged such that the longitudinal direction of the rotation shaft 23D is the axial line x direction. The bearing housing 21D is a hollow cylindrical body supported at a central portion of the casing 40D. The bearing housing 21D rotatably supports the rotation shaft 23D via the pair of bearing portions 22AD and 22BD. As shown in FIG. 20, the bearing housing 21D includes a bearing supporting portion 212D supporting the bearing portion 22AD at one end of a cylindrical housing body 211D in the axial line x direction and a bearing supporting portion 213D supporting the bearing portion 22BD at another end of the housing body 211D in the axial line x direction. The bearing supporting portions 212D and 213D are each formed on the inner peripheral surface of the housing body 211D.

As shown in FIGS. 19 and 20, the pair of bearing portions 22AD and 22BD are specifically the bearing portion 22AD supported by the bearing supporting portion 212D provided at one end of the bearing housing 21D in the axial line x direction and the bearing portion 22BD supported by the bearing supporting portion 213D provided at the other end of the bearing housing 21D in the axial line x direction, as described above. The pair of bearing portions 22AD and 22BD each include the first bearing 221AD, 221BD, the second bearing 222AD, 222BD, and the coupling portion 223AD, 223BD. In each of the pair of bearing portions 22AD and 22BD, the second bearing 222AD, 222BD is provided at a position distanced from the first bearing 221AD, 221BD in the axial line x direction of the rotation shaft 23D.

As shown in FIG. 20, the first bearing 221AD, 221BD includes a first inner race 2211D, a first outer race 2212D, and first rolling elements 2213D. The first inner race 2211D is an annular member having an inner peripheral surface that can be fitted to an outer circumferential surface 23a of the rotation shaft 23D shown in FIG. 18. The first inner race 2211D is rotatable together with the rotation shaft 23D when fitted to the outer circumferential surface 23a of the rotation shaft 23D. The first outer race 2212D is provided on the outer periphery side c of the first inner race 2211D. The first outer race 2212D is an annular member being coaxial with the first inner race 2211D and having a larger diameter than that of the first inner race 2211D. The first rolling elements 2213D are a plurality of spherical members arranged between the first inner race 2211D and the first outer race 2212D. In the first bearing 221AD, 221BD, lubricant is infused between the first inner race 2211D, the first outer race 2212D, and the first rolling elements 2213D.

The second bearing 222AD, 222BD includes a second inner race 2221D, a second outer race 2222D, and second rolling elements 2223D. The second inner race 2221D is an annular member having an inner peripheral surface that can be fitted to the coupling portion 223AD, 223BD. The second inner race 2221D is rotatable together with the first outer race 2212D via the coupling portion 223AD, 223BD when fitted to the coupling portion 223AD, 223BD. The second outer race 2222D is provided on the outer periphery side c of the second inner race 2221D. The second outer race 2222D is an annular member being coaxial with the second inner race 2221D and having a larger diameter than that of the second inner race 2221D. The second rolling elements 2223d are a plurality of spherical members arranged between the second inner race 2221D and the second outer race 2222D. In the second bearing 222AD, 222BD, lubricant is infused between the second inner race 2221D, the second outer race 2222D, and the second rolling elements 2223D. The second bearing 222AD, 222BD may have a property of being less prone to rotate at a high-speed rotation than the first bearing 221AD, 221BD such as by a technique of using a rubber seal-type bearing, for example.

The coupling portions 223AD and 223BD each include a first bearing accommodating part 2231D, a second bearing accommodating part 2232D, a step portion 2233D, and a joint portion 2234AD, 2234BD. The coupling portion 223AD, 223BD rotatably couples the first outer race 2212D and the second inner race 2221D by the first bearing accommodating part 2231D and the second bearing accommodating part 2232D, which are cylindrical portions having different radial dimensions, and the step portion 2233D connecting the first bearing accommodating part 2231D and the second bearing accommodating part 2232D.

The first bearing accommodating part 2231D has an inner peripheral surface that can accommodate the first outer race 2212D of the first bearing 221AD, 221BD. Specifically, the first bearing accommodating part 2231D is formed to have a shape and dimension that is rotatable in cooperation with the first outer race 2212D.

The second bearing accommodating part 2232D has an inner peripheral surface having a shape and dimension to have a predetermined air gap from the outer circumferential surface 23a of the rotation shaft 23D. In addition, the second bearing accommodating part 2232D has an outer circumferential surface that can accommodate the second inner race 2221D of the second bearing 222AD, 222BD. The second bearing accommodating part 2232D is formed to have a shape and dimension that is rotatable in cooperation with the second inner race 2221D.

In addition, the coupling portion 223AD provided on the upper side a in the axial line x direction and the coupling portion 223BD provided on the lower side b are coupled to rotate in conjunction. In the coupling portions 223AD and 223BD, specifically, the coupling portion 223AD on the upper side a and the coupling portion 223BD on the lower side b are coupled to rotate in conjunction by the joint portions 2234AD and 2234BD provided at an end portion on the opposite side to the first bearing accommodating part 2231D in the axial line x direction. The joint portion 2234AD provided to the coupling portion 223AD on the upper side a and the joint portion 2234BD provided to the coupling portion 223BD on the lower side b are coupled to rotate in conjunction by a structure such as fitting or bonding. The joint portion 2234AD is formed to have a depression portion that can receive a protruding portion of the joint portion 2234BD. The joint portion 2234BD is also formed to have a depression portion that can accommodate a protruding portion of the joint portion 2234AD. In the coupling portions 223AD and 223BD, the protruding portion of the joint portion 2234AD and the protruding portion of the joint portion 2234BD accommodate each other, and thus, when one of the coupling portion 223AD and the coupling portion 223BD rotates, the joint portion 2234AD and the joint portion 2234BD contact each other and can rotate integrally together with the other of the coupling portion 223AD and the coupling portion 223BD. Since the coupling portions 223AD and 223BD are configured in this manner, the second bearing 222AD on the upper side a in the axial line x direction and the second bearing 222BD on the lower side b can rotate in conjunction.

Note that the method of coupling the joint portions 2234AD and 2234BD, shapes of coupling the joint portions 2234AD and 2234BD, and the like, are not particularly limited. The joint portions 2234AD and 2234BD are only required to be configured such that either one of the coupling portions 223AD or 223BD can rotate integrally in association with rotation of the other. In addition, the joint portions 2234AD and 2234BD may be formed integrally as long as the motor 10D can be assembled.

As shown in FIG. 18, the stator 24D is fixed on the lower side b, for example, of the casing 40D. The stator 24D includes, for example, a stator core 241D formed by laminating a plurality of electromagnetic steel plates, a coil 242D wound on the stator core 241D, and an insulator 243D provided to the stator core 241D.

The rotor yoke 26D is provided on the inner periphery portion of the hub 25D of the impeller 30D, for example. The rotor yoke 26D is formed in a generally tubular shape, for example, for accommodating the magnet 27D. The rotor yoke 26D may be formed separately from or integrally with the hub 25D. The magnet 27D is attached on the inner peripheral surface of the rotor yoke 26D. The magnet 27D is provided to have a predetermined gap from the stator 24D provided on the inner periphery side d.

As shown in FIG. 18, the base plate 29D is provided on the outer periphery side c of at least one of the bearing portions 22AD and 22BD, for example, the bearing portion 22BD on the lower side at another end of the stator 24D in the axial line x direction. For example, the base plate 29D is a plate-shaped base plate formed in a substantially annular shape on the outer periphery side c of the bearing portion 22BD. A rotor operation detecting sensor 36D as a rotor operation detecting unit is mounted on the upper side a of the base plate 29D. In addition, a bearing operation detecting sensor 372D of the bearing operation detecting unit 37D is mounted on the lower side b of the base plate 29D.

The rotor operation detecting sensor 36D is mounted on the upper side a of the base plate 29D as described above. The rotor operation detecting sensor 36D is arranged in the magnetic field range of the magnet 27D provided on the inner peripheral surface of the hub 25D of the impeller 30D forming the rotor, for example, on the lower side b of the magnet 27D. As the magnet 27D attached to the rotor rotates, the rotor operation detecting sensor 36D outputs a first Hall signal (an example of rotor operation information) as rotor operation information, which is a positional signal according to rotational operation of the magnet 27D. The rotor operation information is, specifically, for example, information according to the rotational frequency of the rotor such as information on the rotational frequency or rotational speed of the rotor, and is, specifically, the first Hall signal mentioned above or information on the rotational frequency of the rotor (a rotor rotational frequency signal) calculated from the first Hall signal. Note that the number of rotor operation detecting sensors 36D is not limited to that in the present embodiment.

The bearing operation detecting unit 37D is formed by a bearing operation detecting magnet 371D and the bearing operation detecting sensor 372D. As shown in FIG. 20, the bearing operation detecting magnet 371D is provided on the outer periphery side c of the first outer race 2212D of the bearing portion 22BD on the lower side b, for example, on the outer periphery side c of the first bearing accommodating part 2231D of the coupling portion 223BD, which covers the outer periphery side c of the first outer race 2212D of the bearing portion 22BD and is rotatable together with the first outer race 2212D. The bearing operation detecting magnet 371D is rotatable together with the first outer race 2212D by being arranged in this manner. The bearing operation detecting sensor 372D is mounted in the magnetic field range of the bearing operation detecting magnet 371D, specifically, on the lower side b of the base plate 29D located on the outer periphery side c of the bearing operation detecting magnet 371D. As the bearing operation detecting magnet 371D attached to the coupling portion 223BD rotating together with the first outer race 2212D rotates, the bearing operation detecting sensor 372D outputs a second Hall signal as bearing operation information, which is a Hall signal according to the rotational operation of the bearing operation detecting magnet 371D. The bearing operation information is, specifically, for example, information on the rotational frequency or rotational speed of the bearing, and is, specifically, the second Hall signal or information according to the rotational frequency of the first bearing 221AD, 221BD (a bearing rotational frequency signal) calculated from the second Hall signal. Note that the number of bearing operation detecting units 37D is not limited to that in the present embodiment.

<Motor State Determination Device of Fourth Embodiment>

Next, configuration of a driving control device 3D as a motor state determination device according to the fourth embodiment will be described.

The driving control device 3D of the motor 10D in the present embodiment is similar to the driving control device 3C of the motor 10C previously described. That is, in the present embodiment, the driving control device 3D of the motor 10D functions as a state determination device that determines the state of the bearing portions 22AD and 22BD of the motor 10D. The driving control device 3D includes a bearing abnormality determining unit 35D as a state determining unit that determines the state of rotational movement of the first bearing 221AD, 221BD by using the bearing operation information output by the bearing operation detecting sensor 372D of the bearing operation detecting unit 37D of the motor 10D and the rotor operation information output by the rotor operation detecting sensor 36D. As will be described later, the bearing abnormality determining unit 35D determines whether at least one of the first bearings 221AD and 221BD is degraded based on the bearing operation information. In addition, the bearing abnormality determining unit 35D determines whether at least one of the first bearings 221AD and 221BD is in failure based on the bearing operation information and the rotor operation information. Hereinafter, the driving control device 3D of the motor 10D functioning as a motor state determination device will be described.

Figure 21:
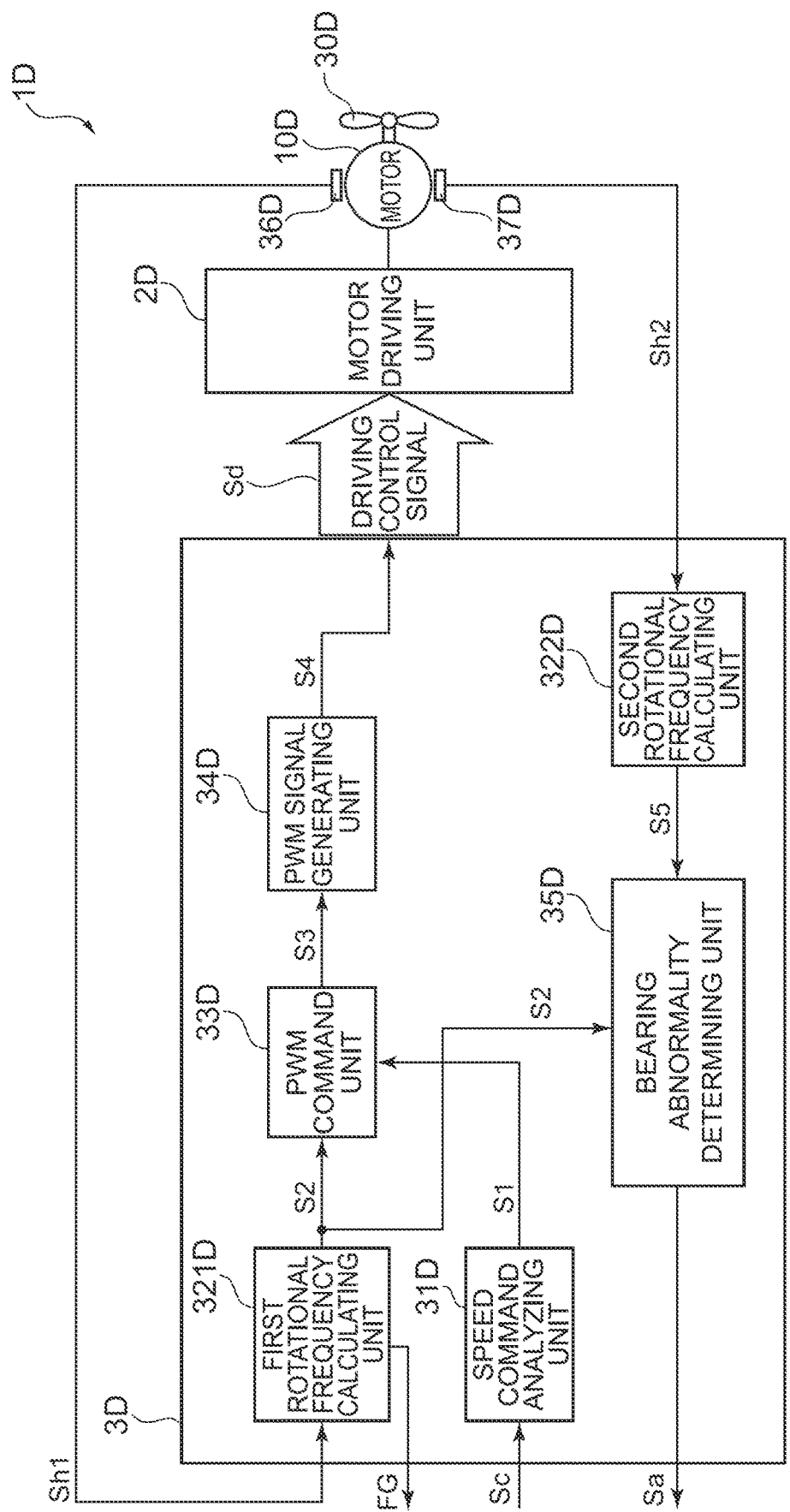
FIG. 21 A functional block diagram of a driving control device of the motor according to the fourth embodiment of the present invention.

FIG. 21 is a functional block diagram of the driving control device 3D of the motor 10D according to the fourth embodiment of the present invention. As shown in FIG. 21, the driving control device (an example of a state determination device) 3D of the motor 10D includes a speed command analyzing unit 31D, a first rotational frequency calculating unit 321D, a second rotational frequency calculating unit 322D, a PWM (Pulse Width Modulation) command unit 33D, a PWM signal generating unit 34D, and the bearing abnormality determining unit (an example of a state determining unit) 35D. The driving control device 3D is realized by, for example, an information processing device capable of executing various computer programs including a program for realizing the following functional blocks of the driving control device 3D according to the present invention, such as an MCU (Micro Controller Unit), and a storage device such as a ROM (Read-Only Memory) for storing the computer programs, data for executing the programs, and the like. The ROM also stores a threshold value used in processing of the bearing abnormality determining unit 35D, which will be described later, for determining that at least one of the first bearings 221AD and 221BD is degraded, and information on the ratio of a rotor rotational frequency signal (an example of rotor operation information) S2 to a bearing rotational frequency signal (an example of bearing operation information) S5 for determining that at least one of the first bearings 221AD and 221BD is in failure.

The speed command analyzing unit 31D receives a speed command signal Sc for the motor 10D from external equipment (not shown) such as a control unit of a server, and generates a target rotational frequency signal S1 for providing an indication to the PWM command unit 33D.

The first rotational frequency calculating unit 321D acquires a first Hall signal Sh1 (information on the rotational frequency of the rotor; an example of rotor operation information) acquired by the rotor operation detecting sensor 36D attached to the motor 10D and provided to detect the rotational frequency of the magnet 27D of the rotor, calculates the rotational frequency of the rotor based on the first Hall signal Sh1, and outputs a rotor rotational frequency signal S2. The first rotational frequency calculating unit 321D outputs the rotor rotational frequency signal S2 to the PWM command unit 33D and the bearing abnormality determining unit 35D. In addition, the first rotational frequency calculating unit 321D outputs the calculated rotational frequency of the rotor to the external equipment as an FG (Frequency Generator) signal FG.

The second rotational frequency calculating unit 322D acquires a second Hall signal Sh2 (information on the rotational frequency of the first outer race 2212D of the first bearing 221AD, 221BD) acquired from the bearing operation detecting unit 37D provided to detect the rotational frequency of the first outer race 2212D of the first bearing 221AD, 221BD of the bearing portions 22AD and 22BD in the motor 10D, calculates the rotational frequency of the first outer race 2212D based on the second Hall signal Sh2, and outputs a bearing rotational frequency signal S5. The second rotational frequency calculating unit 322D outputs the bearing rotational frequency signal S5 to the bearing abnormality determining unit 35D.

The PWM command unit 33D outputs, to the PWM signal generating unit 34D, a PWM setting indication signal S3 generated based on the target rotational frequency signal S1 output from the speed command analyzing unit 31D and the rotor rotational frequency signal S2 output from the first rotational frequency calculating unit 321D. The PWM setting indication signal S3 is a signal indicating setting of a PWM signal to be generated by the PWM signal generating unit 34D, that is, the duty cycle of a PWM signal required to drive the motor 10D at a desired rotational frequency.

The PWM signal generating unit 34D generates and outputs a driving control signal Sd for controlling the motor driving unit 2D, that is, a PWM signal S4 having a desired duty cycle based on the PWM setting indication signal S3 output by the PWM command unit 33D.

A motor driving unit 2D drives the motor 10D based on the driving control signal Sd.

The bearing abnormality determining unit 35D functions as a state determining unit that determines the state of rotational movement of the pair of bearing portions 22AD and 22BD based on the rotor operation information calculated by the first rotational frequency calculating unit 321D and the bearing operation information calculated by the second rotational frequency calculating unit 322D.

When the bearing operation information, that is, the second Hall signal Sh2 that is a pulse signal indicating that the first outer race 2212D is rotating is output from the bearing operation detecting sensor 372D and the bearing rotational frequency signal S5 is output from the second rotational frequency calculating unit 322D, the bearing abnormality determining unit 35D determines that the second bearings 222AD and 222BD are rotating together with the rotation shaft 23D in the bearing portions 22AD and 22BD.

The bearing abnormality determining unit 35D detects whether abnormality such as degradation or failure of at least one of the first bearings 221AD and 221BD of the bearing portions 22AD and 22BD is occurring by comparing the bearing operation information (for example, the bearing rotational frequency signal S5) and the rotor operation information (for example, the rotor rotational frequency signal S2). Specifically, the bearing abnormality determining unit 35D compares the bearing operation information and the rotor operation information to determine that degradation (functional deterioration) of at least one of the first bearings 221AD and 221BD is occurring if the first outer race 2212D is rotating and the ratio of the rotational frequency of the rotor to the rotational frequency of the first outer race 2212D is less than a predetermined numerical value. In addition, the bearing abnormality determining unit 35D compares the bearing operation information and the rotor operation information to determine that the abnormal state, that is, degradation of at least one of the first bearings 221AD and 221BD progresses and the rotation shaft 23D and at least one of the first bearings 221AD and 221BD are locked up, that is, are in failure if the ratio of the rotational frequency of the rotor to the rotational frequency of the first outer race 2212D is greater than or equal to the predetermined numerical value. The bearing abnormality determining unit 35D outputs information on the detected state of the bearing portions 22AD and 22BD to the external equipment as an abnormality reporting signal Sa. Note that the bearing abnormality determining unit 35D is only required to determine the degradation or failure of at least one of the first bearings 221AD and 221BD by using the rotor operation information and the bearing operation information. Thus, the bearing abnormality determining unit 35D may use, for example, the first Hall signal Sh1 or the FG signal FG for the processing instead of the rotor rotational frequency signal S2. In addition, the bearing abnormality determining unit 35D may use, for example, the second Hall signal Sh2 for the processing instead of the bearing rotational frequency signal S5.

[Operation of Fan Device and Driving Control Device]

Next, operation of the fan device 1D and the driving control device 3D of the motor 10D of the fan device 1D having the above-described configuration will be described.

Figure 22:
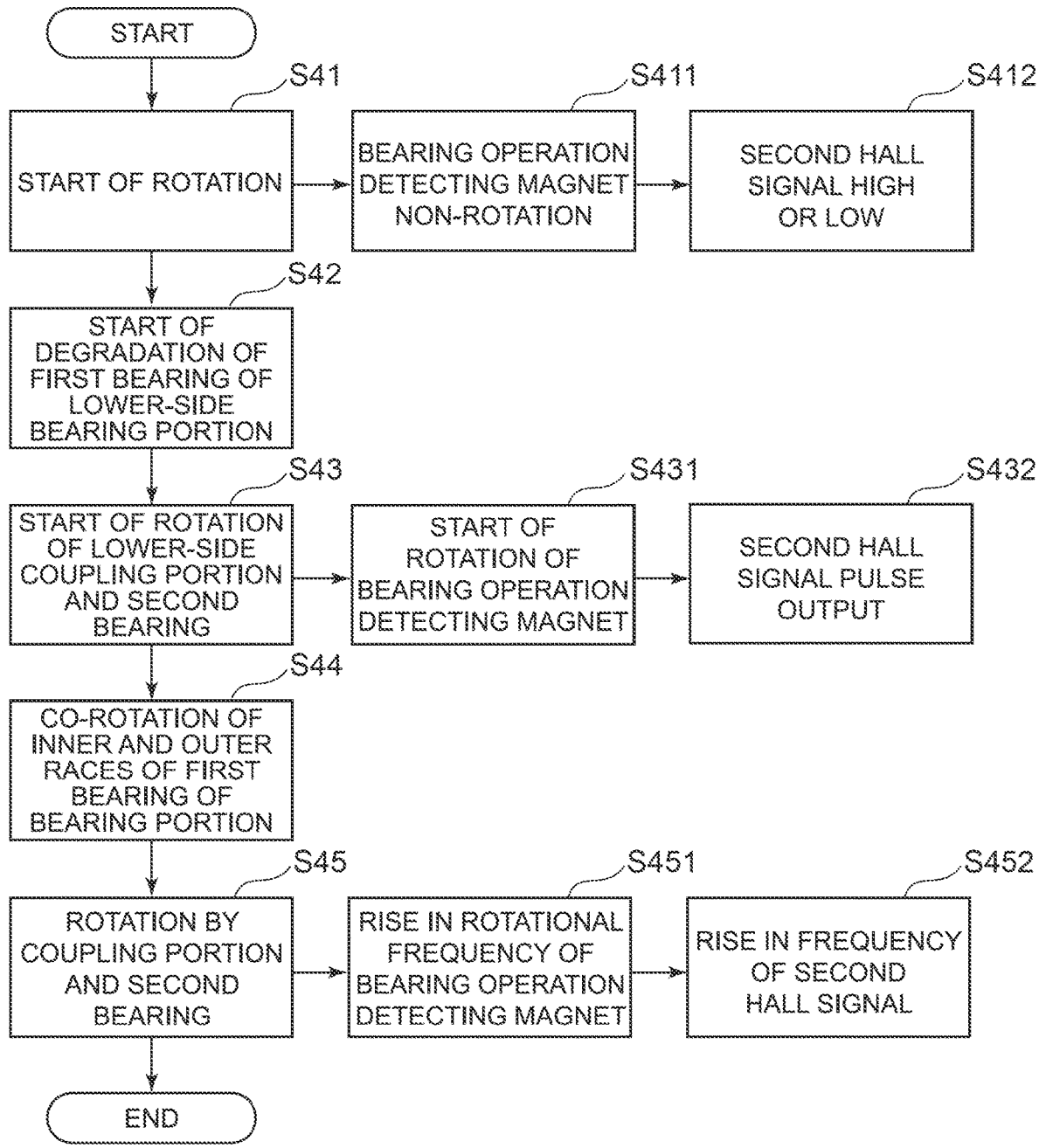
FIG. 22 A flow chart for showing transition of operations of the bearing portions and operations of a bearing operation detecting unit when the bearing portion on the lower side is degraded in the motor included in the fan device shown in FIG. 18.
Figure 23:
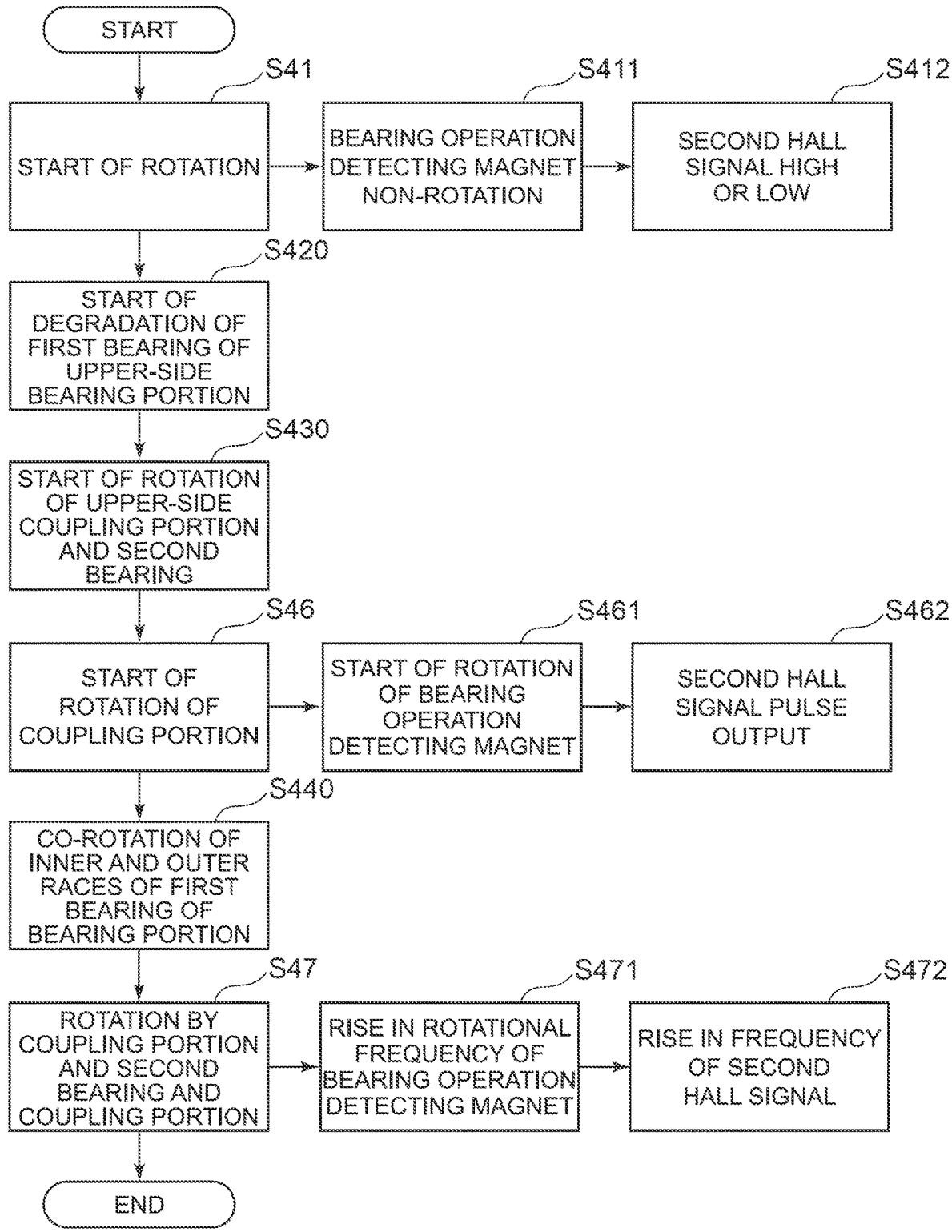
FIG. 23 A flow chart for showing transition of operations of the bearing portions and operations of the bearing operation detecting unit when the bearing portion on the upper side is degraded in the motor included in the fan device shown in FIG. 18.

FIG. 22 is a flow chart for showing transition of operations of the bearing portions 22AD and 22BD and operations of the bearing operation detecting unit 37D when the bearing portion 22BD on the lower side b is degraded in the motor 10D included in the fan device 1D. FIG. 23 is a flow chart for showing transition of operations of the bearing portions 22AD and 22BD and operations of the bearing operation detecting unit 37D when the bearing portion 22AD on the upper side a is degraded in the motor 10D included in the fan device 1D.

Hereinafter, transition of operations of the bearing portions 22AD and 22BD and operations of the bearing operation detecting unit 37D when the bearing portion 22BD on the lower side b is degraded in the motor 10D included in the fan device 1D will be described with reference to FIGS. 22 and 17.

As shown in FIG. 22, in the motor 10D, rotation of the rotation shaft 23D starts when driving current flows (step S41). As shown in FIG. 18, the rotation shaft 23D of the motor 10D is rotatably supported by the pair of bearing portions 22AD and 22BD fitted to the bearing housing 21D. In addition, one end of the rotation shaft 23D on the upper side a is coupled to the hub 25D of the impeller 30D. Thus, when the motor 10D is driven, the rotation shaft 23D rotates about the axial line x, and the impeller 30D also rotates about the axial line x in association.

In the motor 10D, the pair of bearing portions 22AD and 22BD each include the first bearing 221AD, 221BD being rotatable together with the rotation shaft 23D and the second bearing 222AD, 222BD being rotatable together with the first bearing 221AD, 221BD. Here, in the pair of bearing portions 22AD and 22BD, the first inner race 2211D of the first bearing 221AD, 221BD and the outer circumferential surface 23a of the rotation shaft 23D contact each other, and thus the first inner race 2211D and the rotation shaft 23D rotate together. The first outer race 2212D of the first bearing 221AD, 221BD contacts the first bearing accommodating part 2231D of the coupling portion 223AD, 223BD. The second inner race 2221D of the second bearing 222AD, 222BD contacts the second bearing accommodating part 2232D of the coupling portion 223AD, 223BD. Thus, in the bearing portions 22AD and 22BD, when the first bearing 221AD, 221BD is degraded or fails and the first inner race 2211D and the first outer race 2212D rotate integrally, the second bearing 222AD, 222BD rotates together with the rotation shaft 23D.

In the bearing portions 22AD and 22BD of the motor 10D configured as described above, in a regular state (during a predetermined time after starting operation), the first bearing 221AD, 221BD has a normal operational function, and thus the first inner race 2211D is supported by the first rolling elements 2213D and the first outer race 2212D and rotates together with the rotation shaft 23D. In this case, the rotor operation detecting sensor 36D outputs a pulse signal (first Hall signal Sh1) according to the rotational operation as in (a) in FIG. 17 when the rotor rotates at a predetermined rotational frequency, for example.

That is, in the motor 10D, in the regular state, the first inner race 2211D rotates together with the rotation shaft 23D, and thus the first outer race 2212D and the coupling portion 223AD, 223BD, which is rotatable together with the first outer race 2212D, do not rotate. Thus, the bearing operation detecting magnet 371D, which is attached to the outer periphery side c of the coupling portion 223BD, also does not rotate (step S411). Since the bearing operation detecting magnet 371D does not rotate, the second Hall signal Sh2 output from the bearing operation detecting sensor 372D is output as a constant signal of High or Low, not as a pulse signal, as shown in (b) in FIG. 17 (step S412).

Thereafter, in the motor 10D, degradation of the operational function of the first bearing 221BD of the bearing portion 22BD, which is the one of the bearing portions 22AD and 22BD on the lower side b, that is, on the side where the bearing operation detecting magnet 371D is provided in the axial line x direction, starts (step S42). In the bearing portion 22BD, when the rotational torque of the first bearing 221BD exceeds a starting torque of the second bearing 222AD, the coupling portion 223BD and the second bearing 222BD start to rotate (step S43). Specifically, in the bearing portion 22BD, the first inner race 2211D, the first outer race 2212D and the first rolling elements 2213D of the first bearing 221BD integrally rotate together with the rotation shaft 23D. In the motor 10D, in such a state where abnormality such as degradation or failure of the operational function of the first bearing 221BD occurs, in the first bearing 221BD, the rotational torque of the first bearing 221BD rises in association with the degradation or failure conditions, and the first outer race 2212D rotates together with the first inner race 2211D. Thus, the coupling portion 223BD, which is rotatable together with the first outer race 2212D and the first outer race 2212D, also rotates together with the first outer race 2212D. Also, the bearing operation detecting magnet 371D, which is attached to the outer periphery side c of the coupling portion 223BD, also starts to rotate (step S431). In this case, the first bearing 221BD continues the rotational operation with a different ratio than the rotor since the first inner race 2211D and the first rolling elements 2213D are not completely locked up. That is, in the first bearing 221BD, the rotation of the first outer race 2212D is at a lower rotational frequency than the rotation shaft 23D (rotor) and is not synchronized with the rotational frequency of the rotor, and thus, the second Hall signal Sh2 output from the bearing operation detecting sensor 372D is output at a different period than the FG signal FG shown in (a) in FIG. 17, as shown in (c) in FIG. 17 (step S432).

In the coupling portion 223AD, 223BD, the inner peripheral surface of the first bearing accommodating part 2231D is connected to be rotatable together with the first outer race 2212D of the first bearing 221AD, 221BD as described above. In such a state where the first outer race 2212D rotates (co-rotates) together with the first inner race 2211D in the first bearing 221BD (step S44), the rotational torque of the first bearing 221BD exceeds the starting torque of the second bearing 222BD. At this time, in the bearing portion 22BD, the second bearing 222BD starts to rotate together with the rotation shaft 23D via the coupling portion 223BD. That is, the second inner race 2221D of the second bearing 222BD is attached to the outer circumferential surface of the second bearing accommodating part 2232D of the coupling portion 223BD as described above, and can rotate in association with the rotation of the coupling portion 223BD. Thus, in the motor 10D, the coupling portion 223BD and the second bearing 222BD rotate together with the rotation shaft 23D (step S45).

In the motor 10D, when the state where the operational function of the first bearing 221BD is degraded or fail progresses, in the first bearing 221BD, the rotational frequency of the first inner race 2211D, the first rolling elements 2213D, and the first outer race 2212D gradually rises, and the first inner race 2211D, the first rolling elements 2213D, and the first outer race 2212D finally rotate integrally with the rotation shaft 23D at the same rotational frequency as the that of rotation shaft 23D. Thus, the coupling portion 223BD, which is rotatable together with the first outer race 2212D and the first outer race 2212D, also rotates together with the first outer race 2212D at the same rotational frequency as that of the rotation shaft 23D. In addition, the rotational frequency of the bearing operation detecting magnet 371D, which is attached to the outer periphery side c of the coupling portion 223BD, also rises in a manner similar to the rotational frequency of the first outer race 2212D, and the bearing operation detecting magnet 371D rotates at the same rotational frequency as the rotation shaft 23D (step S451). That is, in the first bearing 221BD, the rotation of the first outer race 2212D is synchronized with the rotation shaft 23D (rotor), and thus, the second Hall signal Sh2 output from the bearing operation detecting sensor 372D rises in frequency and is output at a frequency approximately similar to the FG signal FG shown in (a) in FIG. 17, as shown in (d) in FIG. 17 (step S452).

Next, transition of operations of the bearing portions 22AD and 22BD and operations of the bearing operation detecting unit 37D when the bearing portion 22AD on the upper side a is degraded in the motor 10D included in the fan device 1D will be described with reference to FIGS. 23 and 17. Note that, in the following description, the same numbers are used for processes common with the transition of operations of the bearing portions 22AD and 22BD and operations of the bearing operation detecting unit 37D when the bearing portion 22BD on the lower side b is degraded as previously described, and only differences will be described.

As shown in FIG. 23, in the motor 10D, when driving current flows, rotation of the rotation shaft 23D starts, and operations and processes from step S41 to step S412 are performed.

Thereafter, in the motor 10D, degradation of the operational function of the first bearing 221AD of the bearing portion 22AD, which is the one of the bearing portions 22AD and 22BD on the upper side a, that is, on the opposite side to the side where the bearing operation detecting magnet 371D is provided in the axial line x direction, starts (step S420). In the bearing portion 22AD, when the rotational torque of the first bearing 221AD exceeds a starting torque of the second bearing 222AD, the coupling portion 223AD and the second bearing 222AD start to rotate (step S430). Specifically, in the bearing portion 22AD, the first inner race 2211D, the first outer race 2212D, and the first rolling elements 2213D of the first bearing 221AD integrally rotate together with the rotation shaft 23D. In the motor 10D, in such a state where abnormality such as degradation or failure of the operational function of the first bearing 221AD occurs, in the first bearing 221AD, the rotational torque of the first bearing 221AD rises in association with the degradation or failure conditions, and the first outer race 2212D rotates together with the first inner race 2211D. Thus, the coupling portion 223AD, which is rotatable together with the first outer race 2212D and the first outer race 2212D, also rotates together with the first outer race 2212D.

By virtue of the joint portions 2234AD and 2234BD, the coupling portion 223BD, which is coupled to be rotatable together with the coupling portion 223AD, also rotates (step S46). Also, the bearing operation detecting magnet 371D, which is attached to the outer periphery side c of the coupling portion 223BD, also starts to rotate (step S461). In this case, the first bearing 221AD continues the rotational operation with a different ratio than that of the rotor since the first inner race 2211D and the first rolling elements 2213D are not completely locked up. That is, in the first bearing 221AD, the rotation of the first outer race 2212D is at a lower rotational frequency than the rotation shaft 23D (rotor) and is not synchronized with the rotational frequency of the rotor, and thus, the second Hall signal Sh2 output from the bearing operation detecting sensor 372D is output at a different period than the FG signal FG shown in (a) in FIG. 17, as shown in (c) in FIG. 17 (step S462).

In the coupling portion 223AD, 223BD, the inner peripheral surface of the first bearing accommodating part 2231D is connected to be rotatable together with the first outer race 2212D of the first bearing 221AD, 221BD as described above. In such a state where the first outer race 2212D rotates (co-rotates) together with the first inner race 2211D in the first bearing 221AD (step S440), the rotational torque of the first bearing 221AD exceeds the starting torque of the second bearing 222AD. At this time, in the bearing portion 22AD, the second bearing 222AD starts to rotate together with the rotation shaft 23D via the coupling portion 223AD. That is, the second inner race 2221D of the second bearing 222AD is attached to the outer circumferential surface of the second bearing accommodating part 2232D of the coupling portion 223AD as described above, and can rotate in association with the rotation of the coupling portion 223AD.

Thus, in the motor 10D, the coupling portion 223AD and the second bearing 222AD rotate together with the rotation shaft 23D. In addition, the coupling portion 223BD on the lower side b, which is coupled to the coupling portion 223AD, also rotates integrally with the coupling portion 223AD (step S47).

In the motor 10D, when the state where the operational function of the first bearing 221AD is degraded or fail progresses, in the first bearing 221AD, the rotational frequency of the first inner race 2211D, the first rolling elements 2213D, and the first outer race 2212D gradually rises, and the first inner race 2211D, the first rolling elements 2213D, and the first outer race 2212D finally rotate integrally with the rotation shaft 23D at the same rotational frequency as that of the rotation shaft 23D. Thus, the coupling portions 223AD and 223BD, which are rotatable together with the first outer race 2212D and the first outer race 2212D, also rotate together with the first outer race 2212D at the same rotational frequency as that of the rotation shaft 23D. In addition, the rotational frequency of the bearing operation detecting magnet 371D, which is attached to the outer periphery side c of the coupling portion 223BD, also rises in a manner similar to the rotational frequency of the first outer race 2212D, and the bearing operation detecting magnet 371D rotates at the same rotational frequency as that of the rotation shaft 23D (step S471). That is, in the first bearing 221AD, the rotation of the first outer race 2212D is synchronized with the rotation shaft 23D (rotor), and thus, the second Hall signal Sh2 output from the bearing operation detecting sensor 372D rises in frequency and is output at a frequency approximately similar to the FG signal FG shown in (a) in FIG. 17, as shown in (d) in FIG. 17 (step S472).

In the present embodiment as well, processes are performed in a manner similar to the flow chart shown in FIG. 16. That is, in the example of the state detection process for the bearing portions 22AD and 22BD by the driving control device 3D, the bearing abnormality determining unit 35D determines that degradation (functional deterioration) of at least one of the first bearings 221AD and 221BD is occurring if the first outer race 2212D is rotating and the ratio of the rotational frequency of the rotor to the rotational frequency of the first outer race 2212D is less than a predetermined numerical value, as described above. In addition, the bearing abnormality determining unit 35D determines that the degradation of at least one of the first bearings 221AD and 221BD progresses and the rotation shaft 23D and one of the first bearings 221AD and 221BD are locked up, that is, are in failure if the ratio of the rotational frequency of the rotor to the rotational frequency of the first outer race 2212D is greater than or equal to the predetermined numerical value. In the example of the state detection process for the bearing portions 22AD and 22BD shown in FIG. 16, the second Hall signal Sh2 output from the bearing operation detecting unit 37D is used as the bearing operation information. In addition, in the example of the state detection process for the bearing portions 22AD and 22BD shown in FIG. 16, the FG signal FG is used as the rotor operation information.

The bearing abnormality determining unit 35D determines whether the second Hall signal Sh2 has a pulse output waveform shown in (c) in FIG. 17 or (d) in FIG. 17 via the second rotational frequency calculating unit 322D (step S3101).

If the second Hall signal Sh2 does not have the pulse output waveform, that is, the second Hall signal Sh2 is the normal-state signal shown in (b) in FIG. 17 (step S3101: NO), the bearing abnormality determining unit 35D determines that the first bearing 221AD, 221BD is normal (in the state where the first inner race 2211D rotates with the rotation shaft 23D and the first outer race 2212D does not rotate) in the bearing portions 22AD and 22BD of the motor 10D based on the second Hall signal Sh2 (step S3102).

If the second Hall signal Sh2 has the pulse output waveform, that is, it is a signal output when the first bearing 221AD, 221BD is degraded or fails as shown in (c) in FIG. 17 or (d) in FIG. 17 (step S3101: YES), the bearing abnormality determining unit 35D compares the second Hall signal Sh2 and the FG signal FG and determines whether the ratio of the rotational frequency of the first outer race 2212D to rotational frequency of the rotor is a predetermined value (step S3103). For example, when the first bearing 221AD is degraded, the rotational torque of the first bearing 221AD gradually increases, and thus the period of the pulse signal of the second Hall signal Sh2 becomes closer to the period of the pulse signal as the FG signal FG. That is, in other words, when the first bearing 221AD is degraded, the rotational frequency of the first outer race 2212D becomes closer to a predetermined rotational frequency that is the actual rotational frequency of the motor 10D. In this step, either whether the first bearing 221AD, 221BD is degraded or whether the first bearing 221AD, 221BD is in failure is determined based on the ratio in period between the second Hall signal Sh2 and the FG signal FG.

If the period of the second Hall signal Sh2 does not have a pulse output waveform with a predetermined ratio relative to the period of the FG signal FG (in the present embodiment, a longer period than the FG signal FG in (a) in FIG. 17) as shown in (c) in FIG. 17 (step S3103: NO), the bearing abnormality determining unit 35D determines that the first outer race 2212D is rotating but the rotation of the first outer race 2212D is not synchronized with the rotation of the rotation shaft 23D (rotor), and thus the first outer race 2212D is in a degraded state of rotating at less than a predetermined rotational frequency (step S3104).

On the other hand, if the period of the second Hall signal Sh2 has a pulse output waveform with a predetermined ratio relative to the period of the FG signal FG (in the present embodiment, the same period as the FG signal FG in (a) in FIG. 17) as shown in (d) in FIG. 17 (step S3103: YES), the bearing abnormality determining unit 35D determines that the rotation of the first outer race 2212D is synchronized with the rotation of the rotation shaft 23D (rotor) in the first bearing 221AD, 221BD (the first bearing 221AD, 221BD is rotating at the same predetermined rotational frequency as that of the rotation shaft 23D), and determines that the first inner race 2211D, the first outer race 2212D, and the first rolling elements 2213D of the first bearing 221AD or 221BD are in a failure state of being locked up (step S3105).

With the motor 10D configured as described above, it is possible to output the second Hall signal Sh2 from the bearing operation detecting unit 37D, which detects the operational conditions of the first outer race 2212D of the first bearing 221AD, 221BD, in the motor 10D in which the rotation shaft 23D is supported by the pair of bearing portions 22AD and 22BD including the first bearing 221AD and the second bearing 222AD, the first bearing 221BD and the second bearing 222BD. In addition, with the driving control device 3D of the motor 10D, the operational state of the bearing portions 22AD and 22BD is determined from the bearing rotational frequency signal S5 based on the second Hall signal Sh2 output from the motor 10D. Thus, it is possible to easily determine which of the first bearing 221AD, 221BD or the second bearing 222AD, 222BD is operating in the bearing portions 22AD and 22BD, that is, the operational state of the bearing portions 22AD and 22BD. That is, with the driving control device 3D of the motor 10D configured as described above, it is possible to easily determine the operational state of the bearing portions 22AD and 22BD of the motor 10D and thus predict the replacement timing and life of the bearing portions 22AD and 22BD.

With the motor 10D, since the coupling portions 223AD and 223BD respectively included in the pair of bearing portions 22AD and 22BD provided at a distance on the upper side a and the lower side b in the axial line x direction are coupled to rotate in conjunction, it is possible to detect failure that occurs in either one of the pair of bearing portions 22AD and 22BD by monitoring abnormality occurrence conditions of one bearing portion, for example, the bearing portion 22BD by the bearing operation detecting magnet 371D and the bearing operation detecting sensor 372D of the bearing operation detecting unit 37D. That is, with the motor 10D, it is possible to detect failure of the bearing portions 22AD and 22BD with a simple structure and improve the reliability of the bearings. In addition, with the motor 10D, by virtue of a structure in which the joint portions 2234AD and 2234BD of the coupling portions 223AD and 223BD are meshed to enable integral rotation, the coupling portions 223AD and 223BD and the second bearings 222AD and 222BD attached to the coupling portions 223AD and 223BD are less prone to rotate even at the time of high-speed rotation.

Therefore, with the driving control device 3D of the motor 10D configured as described above, it is possible to improve the reliability of the bearings.

Besides, those skilled in the art can modify the motor and the motor state detection device of the present invention as appropriate in accordance with conventionally known knowledge. It is apparent that such modification is still encompassed by the scope of the present invention as long as the configuration of the present invention is still provided. For example, although in the above-described embodiments, the motor 10 is an outer rotor-type brushless DC motor, the type and structure of the motor is not limited thereto in the present invention. In addition, although in the above-described embodiments, the first outer race 2212 and the second inner race 2221 are connected by using the coupling portion 223 in the case where the first bearing 221 and the second bearing 222 of the bearing portions 22A and 22B are arranged at positions distanced in the axial line x direction, the present invention is not limited thereto. For example, similar action may be obtained by connecting the first outer race 2212 and the second inner race 2221 by welding or the like. In addition, in the driving control device 3 of the motor 10, the abnormality reporting signal Sa and the FG signal FG may be output through a common output line. Further, in the driving control device 3 of the motor 10, the predetermined values of the rotational frequency signal S2 and the current signal S5 of the motor 10 used for abnormality determination are not limited to the above-described examples, and any value can be used. In addition, the motor current used for abnormality determination is not limited to the current flowing in the motor driving unit and may be current flowing in another circuit portion.

In addition, although in the above-described embodiments, the first outer race 2212C, D and the second inner race 2221C, D are connected by using the coupling portion 223C, AD in the case where the first bearing 221C, AD and the second bearing 222C, BD of the bearing portions 22AC, AD and 22BC, BD are arranged at positions distanced in the axial line x direction, the present invention is not limited thereto. For example, similar action may be obtained by connecting the first outer race 2212C, D and the second inner race 2221C, D by welding or the like. In addition, in the driving control device 3C, D of the motor 10C, D, the abnormality reporting signal Sa and the FG signal FG may be output through a common output line. In addition, in the driving control device 3C, D of the motor 10C, D, the predetermined values of the rotor rotational frequency signal S2 and the bearing rotational frequency signal S5 of the motor 10C, D used for abnormality determination are not limited to the above-described examples, and any value can be used. In addition, determination of whether the period of the bearing rotational frequency signal S5 and the period of the rotor rotational frequency signal S2 are equivalent may be determined based on a correlation between the period of the bearing rotational frequency signal S5 and the period of the rotor rotational frequency signal S2, and thus those periods may not be the same. Further, although in the present embodiments, the bearing operation detecting unit 37, 37D, which detects rotational operation of the bearing portion 22AC, AD, 22BC, BD, is attached only to the bearing portion 22AC, AD, the bearing operation detecting unit 37, 37D may be attached to the bearing portion 22BC, BD, or the bearing operation detecting unit 37, 37D may be attached to each of the pair of bearing portions 22AC, AD, 22BC, BD.

The second bearing 222AD, 222BD may have a property of being less prone to rotate at a high-speed rotation than the first bearing 221AD, 221BD by a technique other than using a rubber seal-type bearing as described above. Specifically, the coupling portion 223BD may be made less prone to rotate by creating a structure in which a magnetic member such as a steel plate is added, for example, on the inner periphery side d of the bearing housing 21D, near the bearing operation detecting magnet 371D provided on the outer periphery side c of the second bearing 222BD. In addition, the coupling portion 223AD, 223BD may be made less prone to rotate by arranging a magnet on the outer periphery side c of the coupling portion 223AD, 223BD provided on the inner periphery side d of the second inner race 2221D of the second bearing 222AD, 222BD and generating magnetic force to the stator 24D to provide suction force such that the coupling portion 223AD, 223BD is made less prone to rotate.

In addition, for example, the first bearing 221AD, 221BD and the second bearing 222AD, 222BD may have different kinetic viscosities from each other such as due to difference in the coefficients of mechanical friction of the components and the viscosities of the lubricants used in the first bearing 221AD, 221BD and the second bearing 222AD, 222BD.

LIST OF REFERENCE SIGNS 1, 1C, 1D fan device,
2, 2C, 2D motor driving unit,
3, 3C, 3D driving control device (example of state determination device),
10, 10C, 10D motor,
21, 21b, 21C, 21D bearing housing,
22A, 22B, 22Ab, 22Bb, 22AC, 22BC, 22AD, 22BD bearing portion,
23, 23C, 23D rotation shaft,
23a outer circumferential surface,
24, 24C, 24D stator,
25, 25C, 25D hub,
26, 26C, 26D rotor yoke, 27, 27C, 27D magnet,
28, 28C, 28D blade,
30, 30C, 30D impeller,
31, 31C, 31D speed command analyzing unit,
32 rotational frequency calculating unit,
33, 33C, 33D PWM command unit,
34, 34C, 34D PWM signal generating unit,
35, 35C, 35D bearing abnormality determining unit (example of state determining unit),
36C, 36D rotor operation detecting sensor (example of rotor operation detecting unit),
37, 37D bearing operation detecting unit,
40, 40C, 40D casing,
211, 211b, 211C, 211D housing body,
212, 212b, 212C, 212D bearing supporting portion,
213, 213b, 213C, 213D bearing supporting portion,
221, 221b, 221C, 221AD, 221BD first bearing,
222, 222b, 222C, 222AD, 222BD second bearing,
223, 223C, 223D coupling portion,
241, 241C, 241D stator core,
242, 242C, 242D coil,
243C, 243D insulator,
291C first base plate,
292C second base plate,
321C, 321D first rotational frequency calculating unit,
322C, 322D second rotational frequency calculating unit,
371, 371D bearing operation detecting magnet,
372, 372D bearing operation detecting sensor,
2211, 2211b, 2211C, 2211D first inner race,
2212, 2212b, 2212C, 2212D first outer race,
2213, 2213b, 2213C, 2213D first rolling element,
2221, 2221b, 2221C, 2221D second inner race,
2222, 2222b, 2222C, 2222D second outer race,
2223, 2223b, 2223C, 2223D second rolling element,
2231, 2231C, 2231D first bearing accommodating part,
2232, 2232C, 2232D second bearing accommodating part,
2233, 2233C, 2233D step portion,
2234AD, 2234BD (2234D) joint portion,
Sc speed command signal,
S1 target rotational frequency signal,
S2 rotor rotational frequency signal (example of rotor operation information)
S3 PWM setting indication signal,
S4 PWM signal,
S5 bearing rotational frequency signal (example of bearing operation information),
Sd driving control signal,
Sh1 first Hall signal (example of rotor operation information),
Sh2 second Hall signal (example of bearing operation information),
Sa abnormality reporting signal,
FG FG signal

The invention claimed is:

1. A motor comprising:
a rotor having a rotation shaft;
a stator arranged oppositely in a circumferential direction of the rotor; and
a pair of bearing portions rotatably supporting the rotation shaft, wherein
the pair of bearing portions each comprise:
a first bearing being rotatable together with the rotation shaft; and
a second bearing being rotatable together with the first bearing, and
the first bearing rotates together with the rotation shaft when the first bearing is normal, and the second bearing as well as the first bearing rotates together with the rotation shaft when the first bearing is abnormal,
wherein
each bearing portion of the pair of bearing portions comprise a coupling portion coupling the first bearing and the second bearing to rotate in conjunction, and
the coupling portions respectively comprised in the pair of bearing portions are coupled to rotate in conjunction.

2. The motor according to claim 1, wherein
the first bearing comprises a first inner race being rotatable together with the rotation shaft, a first outer race provided on an outer periphery side of the first inner race, and a first rolling element arranged between the first inner race and the first outer race, and
the second bearing comprises a second inner race being rotatable together with the first outer race, a second outer race provided on an outer periphery side of the second inner race, and a second rolling element arranged between the second inner race and the second outer race.

3. The motor according to claim 2, wherein
the second bearing is provided at a position distanced from the first bearing in an axial line direction of the rotation shaft.

4. The motor according to claim 2, wherein
the second bearing is provided on an outer periphery side of the first bearing.

5. The motor according to claim 2, wherein
the pair of bearing portions each comprise a coupling portion rotatably coupling the first outer race and the second inner race.

6. The motor according to claim 1, wherein
the first bearing comprises a first inner race being rotatable together with the rotation shaft, a first outer race provided on an outer periphery side of the first inner race, and a first rolling element arranged between the first inner race and the first outer race,
the second bearing is provided at a position distanced from the first bearing in an axial line direction of the rotation shaft, and comprises a second inner race being rotatable together with the first outer race, a second outer race provided on an outer periphery side of the second inner race, and a second rolling element arranged between the second inner race and the second outer race, and
the coupling portion rotatably couples the first outer race and the second inner race.

7. The motor according to claim 6,
comprising a bearing operation detecting unit detecting operation of at least one of the pair of bearing portions, wherein
the bearing operation detecting unit outputs bearing operation information according to rotational operation of the first outer race.

8. The motor according to claim 7, wherein
the bearing operation detecting unit comprises a bearing operation detecting magnet being rotatable together with the first outer race and a bearing operation detecting sensor outputting the bearing operation information according to rotational operation of the bearing operation detecting magnet.

9. A motor comprising:
a rotor having a rotation shaft;
a stator arranged oppositely in a circumferential direction of the rotor; and a pair of bearing portions rotatably supporting the rotation shaft, wherein
the pair of bearing portions each comprise:
a first bearing being rotatable together with the rotation shaft; and
a second bearing being rotatable together with the first bearing, and
the first bearing rotates together with the rotation shaft when the first bearing is normal, and the second bearing as well as the first bearing rotates together with the rotation shaft when the first bearing is abnormal,
wherein the first bearing has a kinetic viscosity lower than a kinetic viscosity of the second bearing.

10. A motor comprising:
a rotor having a rotation shaft;
a stator arranged oppositely in a circumferential direction of the rotor; and
a pair of bearing portions rotatably supporting the rotation shaft, wherein
the pair of bearing portions each comprise:
a first bearing being rotatable together with the rotation shaft; and
a second bearing being rotatable together with the first bearing, and
the first bearing rotates together with the rotation shaft when the first bearing is normal, and the second bearing as well as the first bearing rotates together with the rotation shaft when the first bearing is abnormal,
further comprising a bearing operation detecting unit detecting operation of the bearing portions, wherein
the first bearing comprises a first inner race being rotatable together with the rotation shaft, a first outer race provided on an outer periphery side of the first inner race, and a first rolling element arranged between the first inner race and the first outer race,
the second bearing comprises a second inner race being rotatable together with the first outer race, a second outer race provided on an outer periphery side of the second inner race, and a second rolling element arranged between the second inner race and the second outer race, and
the bearing operation detecting unit outputs bearing operation information according to rotational operation of the first outer race.

11. The motor according to claim 10, wherein
the bearing operation detecting unit comprises a bearing operation detecting magnet being rotatable together with the first outer race and a bearing operation detecting sensor outputting the bearing operation information according to rotational operation of the bearing operation detecting magnet.

12. The motor according to claim 10, wherein
the second bearing is provided at a position distanced from the first bearing in an axial line direction of the rotation shaft, and
the pair of bearing portions each comprise a coupling portion rotatably coupling the first outer race and the second inner race.

* * * * *